US010523921B2

(12) United States Patent
Chavez et al.

(10) Patent No.: US 10,523,921 B2
(45) Date of Patent: *Dec. 31, 2019

(54) REPLACING 2D IMAGES WITH 3D IMAGES

(71) Applicant: zSpace, Inc., Sunnyvale, CA (US)

(72) Inventors: David A. Chavez, San Jose, CA (US); Jonathan J. Hosenpud, San Francisco, CA (US); Clifford S. Champion, San Jose, CA (US); Alexandre R. Lelievre, Hollywood, CA (US); Arthur L. Berman, San Jose, CA (US); Kevin S. Yamada, Sunnyvale, CA (US)

(73) Assignee: zSpace, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/947,140

(22) Filed: Apr. 6, 2018

(65) Prior Publication Data

US 2019/0313083 A1 Oct. 10, 2019

(51) Int. Cl.
*H04N 13/279* (2018.01)
*G06F 3/01* (2006.01)
*G06T 15/20* (2011.01)
*G06F 16/9535* (2019.01)

(52) U.S. Cl.
CPC .......... *H04N 13/279* (2018.05); *G06F 3/013* (2013.01); *G06F 16/9535* (2019.01); *G06T 15/205* (2013.01)

(58) Field of Classification Search
None
See application file for complete search history.

(56) References Cited

U.S. PATENT DOCUMENTS

| 7,206,006 B2* | 4/2007 | Nah ............... G09G 5/005 345/660 |
| 7,337,392 B2* | 2/2008 | Lue ........... G06F 17/30905 707/E17.121 |
| 8,433,140 B2* | 4/2013 | Ke ............... G06K 9/6202 382/209 |
| 2005/0055344 A1* | 3/2005 | Liu ............ G06F 17/30256 |
| 2006/0064411 A1* | 3/2006 | Gross .......... G06F 17/30864 |

(Continued)

OTHER PUBLICATIONS

J. Konrad, G. Brown, M. Wang, P. Ishwar, C. Wu, D. Mukherjee, "Automatic 2D-to-3D image conversion using 3D examples from the internet", Feb. 22, 2012, SPIE, Proc. SPIE 8288, Stereoscopic Displays and Applications XXIII.*

(Continued)

*Primary Examiner* — Robert Bader
(74) *Attorney, Agent, or Firm* — Kowert Hood Munyon Rankin & Goetzel, P.C.; Jeffrey C. Hood; Brian E. Moore

(57) ABSTRACT

Systems and methods for replacing a 2D image with an equivalent 3D image within a web page. The 2D image displayed within a web page may be identified and a 3D image with substantially equivalent content may also be identified. The 3D image may be integrated into the web page as a replacement to the 2D image. Further, at least one user input manipulating the 3D image within the web page may be received. The at least one user input may include movement of a view point (or point of view) of a user relative to a display displaying the web page and/or detection of a beam projected from an end of a user input device (and/or an end of the user input device) intersecting with the 3D image.

30 Claims, 17 Drawing Sheets

(56) References Cited

U.S. PATENT DOCUMENTS

| | | | | |
|---|---|---|---|---|
| 2011/0050687 A1* | 3/2011 | Alyshev | ............ | G06T 15/00 |
| | | | | 345/419 |
| 2011/0161843 A1* | 6/2011 | Bennett | ............ | G06F 3/14 |
| | | | | 715/760 |
| 2012/0046078 A1* | 2/2012 | Kim | ............ | H04N 13/359 |
| | | | | 455/566 |
| 2012/0050284 A1* | 3/2012 | Ahn | ............ | H04N 13/026 |
| | | | | 345/419 |
| 2012/0084652 A1* | 4/2012 | Martinez Bauza | .. | H04N 13/167 |
| | | | | 715/719 |
| 2013/0090101 A1 | 4/2013 | Park | | |
| 2014/0143733 A1 | 5/2014 | Jung | | |
| 2015/0091906 A1 | 4/2015 | Dishno | | |

OTHER PUBLICATIONS

Leonard McMillan, Gary Bishop, "Head-tracked stereoscopic display using image warping", Mar. 30, 1995, SPIE, Proc. SPIE 2409, Stereoscopic Displays and Virtual Reality Systems II.*

Ritendra Datta, Dhiraj Joshi, Jia Li, James Z. Wang, "Image Retrieval: Ideas, Influences, and Trends of the New Age", Apr. 2008, ACM, ACM Computing Surveys, vol. 40, No. 2, Article 5.*

Juan Manuel Barrios, Diego D'iaz-Espinoza, and Benjamin Bustos, "Text-Based and Content-Based Image Retrieval on Flickr: DEMO", 2009, IEEE, 2009 Second International Workshop on Similarity Search and Applications.*

Mingyu Chen, Ghassan AlRegib, Biing-Hwang Juang, "An Integrated Framework for Universal Motion Control", Dec. 12, 2011, ACM, VRCAI '11 Proceedings of the 10th International Conference on Virtual Reality Continuum and Its Applications in Industry, pp. 513-518.*

Yushi Jing, Member, Shumeet Baluja, "VisualRank: Applying PageRank to Large-Scale Image Search", Nov. 2008, IEEE, IEEE Transactions on Pattern Analysis and Machine Intelligence, vol. 30, No. 11.*

Hirokazu Yamanoue, "The Relation between Size Distortion and Shooting Conditions for Stereoscopic Images", Apr. 1997, SMPTE, SMPTE Journal, vol. 106, Issue 4.*

International Search Report and Written Opinion in related international application No. PCT/US2019/025939 dated May 17, 2019.

* cited by examiner

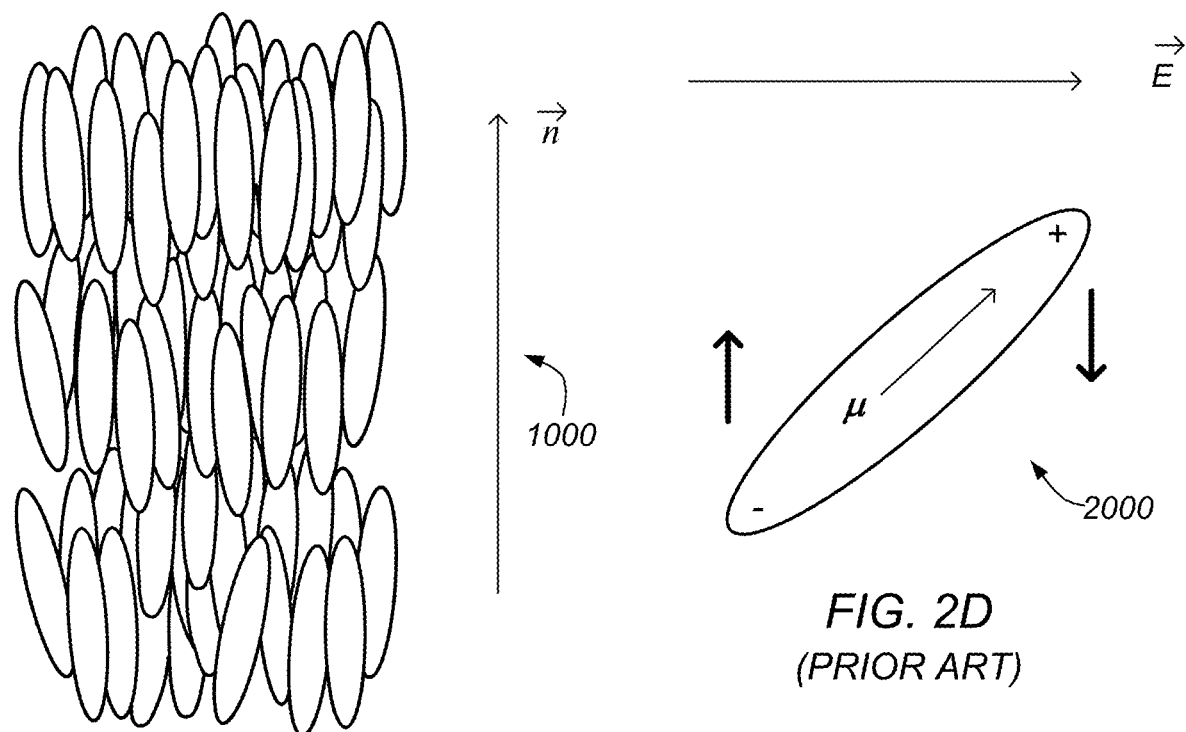
FIG. 2C
(PRIOR ART)
FIG. 2D
(PRIOR ART)
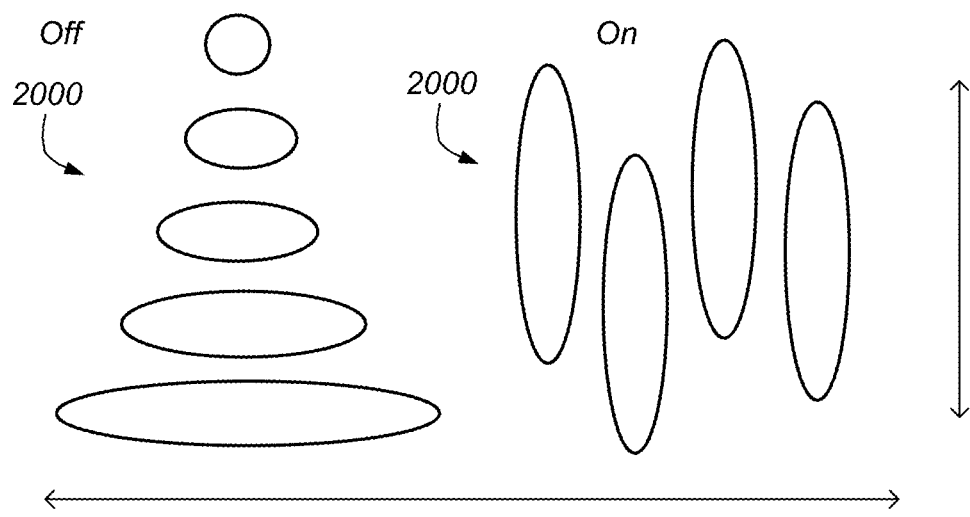
FIG. 2E
(PRIOR ART)

REPLACING 2D IMAGES WITH 3D IMAGES

TECHNICAL FIELD

This disclosure relates to the field of digital display and more particularly to methods for replacing two-dimensional images in a web page with substantially equivalent three-dimensional images.

DESCRIPTION OF THE RELATED ART

Three-dimensional (3D) displays (actually, simulated 3D, e.g., via stereoscopic display (SD) techniques) are increasingly utilized for a variety of applications, including, for example, remote viewing, videoconferencing, video collaboration, and so forth.

FIG. 1 illustrates a modern display chain, according to typical prior art embodiments, which includes the following components:

1. GPU—Graphics Processing Unit. This component resides on a personal computer, workstation, or functional equivalent, and outputs video levels for each color or channel of a supported color model, e.g., for each of three colors, typically Red (R), Green (G), and Blue (B), for each pixel on the display. Each of these numbers is typically an 8-bit number, with a range of 0 to 255, although other ranges are possible.

2. Scaler—This component takes as input the video levels (e.g., for R, G, and B) for each pixel output from the GPU, and processes them in various ways, before outputting (usually) modified video levels for RGB, usually in the same 8-bit range of 0-255. This component may also scale an image from the input resolution to a different, rendered resolution supported by the display.

3. Panel—This component is the display itself, typically a liquid crystal display (LCD), though other displays are possible, and takes as input the video levels (e.g., for R, G and B) output from the scaler for each pixel, and converts the video levels to voltages, which are then delivered to each pixel on the display. The panel itself may modify the video levels before converting them to voltages.

The video chain generally modifies the video levels in two ways, specifically gamma correction and overdrive. Note that the functionality described above is typically implemented in the scaler, but is sometimes implemented at least partially in other devices or elements of the video chain, e.g., in the GPU or display device (panel).

Time Sequential Stereo Displays

Unlike a normal (i.e., monoscopic) display, in a stereo display, there are two images for each video frame: right and left. The right image must be delivered to only an observer's right eye, and the left image must be delivered to only the observer's left eye. In a time sequential stereo display, this separation of right and left images is performed in time, i.e., the left and right images are presented sequentially, and thus, contains some time-dependent element which separates these two images. There are two common architectures for stereo displays.

The first architecture uses a device called a polarization switch (PS), which may be a distinct (i.e., separate) or integrated LC device or other technology switch and which is placed in front of the LCD panel (or any other type of imaging panel, such as an OLED (organic light emitting diode) panel, a plasma display, etc.) or any other pixelated panel display used in a time-sequential stereo imaging system. Specifically, the PS switch may be placed between the display panel and the viewer, as shown in FIG. 2A. The purpose of the PS is to switch the light transmitted from the display panel between two orthogonal polarization states. For example, one of these states may be horizontally linearly polarized light (i.e., the light may be in a horizontal linear polarization state), and the other may be vertically linearly polarized light (i.e., the light may be in a vertical linear polarization state); however, other options are possible (e.g., left and right circular polarization states, etc.). The key feature that allows the PS to deliver the correct image to the correct eye of the viewer (i.e., the left image to the left eye and the right image to the right eye) is that the two polarization states are orthogonal to each other.

This architecture allows achievement of the stereo effect shown in prior art FIG. 2B. As may be seen, the top portion of the figure shows the (display) panel switching between a left image and a right image. Synchronous with the panel switching, the PS is switching the light being transmitted between a left state and a right state, as shown. These two states emit two corresponding orthogonal polarization states, as explained above. As FIG. 2B further shows, the system includes stereoscopic eyewear that is designed such that the left lens will only pass the left state polarization and the right lens will only pass the right state polarization. In this way, separation of the right and left images is achieved.

The second conventional architecture uses stereoscopic shutter glasses, which replace (or integrate the functionality of) the PS and eyewear. In such systems, each eye is covered by an optical shutter, which can be either open or closed. Each of these shutters is cycled between opened and closed synchronously with the display panel in such a way that when the left image is shown on the display, only the left eye shutter is open, and when the right image is shown on the display, only the right eye shutter is open. In this manner, the left and right views are alternatingly presented to the user's left and right eye, respectively. The alternate presentation of left and right views to the user's left and right eyes creates the perception of visual depth, as shown in FIG. 4. Virtual objects may be displayed in this created 3D space, which exists both above the 3D stereoscopic display panel (i.e., negative space) and below the stereoscopic display panel (i.e., positive space).

Liquid Crystal Displays (LCDs)

Some of the advantages of a liquid crystal display (LCD) include lighter weight, lower power consumption, and less radiation contamination. LCD monitors have been widely applied to various portable information products (e.g., user equipment devices such as laptops, tablets, mobile phones, PDAs, and so forth). Typically, in an LCD monitor, incident light produces different polarization or refraction effects when the alignment of liquid crystal molecules is altered. The liquid crystal molecules affect the transmission of the incident light, and thus a magnitude of the light emitted from the liquid crystal molecules varies. The LCD monitor utilizes the characteristics of the liquid crystal molecules to control the corresponding light transmittance and produces images per different magnitudes of red, blue, and green light.

A schematic image of a nematic liquid crystalline phase 1000 is shown in FIG. 2C. The liquid crystal materials have no positional long-range ordering of their molecules' centers of mass, as in crystals. However, the liquid crystal materials possess long-range orientational ordering of their molecules along a main axis direction (in the simplest case of so-called nematic liquid crystal), effectively allowing the molecules to be aligned along one preferred direction, called the director of the liquid crystal, $\vec{n}$ (see FIG. 2C).

Liquid crystal molecules either possess a permanent dipole moment, or acquire the induced dipole moment when placed in an electric field. In both cases, in the electric field a liquid crystal molecule 2000 is characterized by some dipole moment, $\mu$. This dipole may be aligned along the molecule's symmetry axis (such materials are said to have the positive dielectric anisotropy) or perpendicular to it (the negative dielectric anisotropy). The separation of charge in a molecule leads to its rotation in the electric field until it is aligned parallel or perpendicular to the applied field, depending on a sign of the material's dielectric anisotropy. FIG. 2D depicts such re-orientation of a liquid crystal molecule with the positive dielectric anisotropy.

As all of the molecules in the liquid crystalline phase are subject to the re-orientation under the effect of the electric field at the same time, it is possible to control the symmetry axis of the phase (the director) and usually the optical axis of the liquid crystalline sample.

FIG. 2E illustrates the configuration of liquid crystal molecules 300 within a conventional twisted nematic liquid crystal based polarization rotator. The nematic liquid crystal is chosen to have a positive dielectric anisotropy. The left-hand side of the figure illustrates the voltage OFF, 90-degree rotation state. The right-hand side of the figure illustrates the voltage ON, 0-degree rotation state.

Depending on the type of the liquid crystal cell and the relative orientations of the liquid crystal cell's optical axis and the polarizers' transmission axis, the polarization rotator can operate in either Normal White (NW) or Normal Black (NB) mode. These modes are governed by the optical transmission in the zero or low-voltage state, i.e. the Normal White mode corresponds to the maximum optical transmission in the zero or low-voltage state, and the minimum transmission in the high-voltage state; it is the opposite for the Normal Black mode.

The twisted nematic polarization rotator usually operates in the Normal White mode. In this case the higher applied voltage improves the contrast ratio of the Normal White mode due to the decrease of the residual retardation of a liquid crystal cell.

Other type of polarization rotators such as electrically controlled birefringence (ECB) mode can operate both in Normal White and Normal Black modes. Using additional optical elements in the 3D system (such as two orthogonal polarizers), the same polarization rotator can operate in the both modes alternately in each every frame.

SUMMARY

Various embodiments of systems for implementing methods for replacing two-dimensional (2D) images in a web page with substantially equivalent three-dimensional (3D) images are disclosed herein. In some embodiments, the 3D images may be derived from alternative 3D imagery. The alternative 3D imagery (or images) may be available from the web site being visited (e.g., hosting the web page) and/or from elsewhere in the Internet. In addition, various embodiments of systems for implements methods for determining and/or selecting (e.g., based, at least in part, on one or more criterion) an optimum (e.g., substantially equivalent) 3D replacement image are disclosed herein.

In some embodiments, a system may include one or more displays and at least one processor coupled to (or in communication with) the one or more displays. In some embodiments, the one or more displays and at least one processor may be comprised in and/or in communication with a head mounted display system. In some embodiments, the system may further include a stylus communicatively coupled to the at least one processor and a memory coupled to the at least one processor. The processor may be configured to perform or implement embodiments of the techniques disclosed herein. Additionally, a method implementing embodiments of the techniques disclosed herein may be implemented on a computer system or stored as program instructions on a computer readable memory medium. In some embodiments, the computer system may comprise a mobile device, such as a user equipment device (UE).

In some embodiments, a 2D image displayed within a web page may be identified. In addition, a 3D image with substantially equivalent content as compared to the content of the 2D image may be identified. The 3D image may be integrated into the web page, thereby replacing the 2D image with the 3D image. Further, at least one user input manipulating the 3D image within the web page may be received. In some embodiments, the at least one user input may include movement of a view point (or point of view) of a user relative to a display displaying the web page. In some embodiments, the at least one user input may include detection of a beam projected from an end of a user input device (and/or an end of the user input device) intersecting with the 3D image. In some embodiment, the intersection with the 3D image may be based, at least in part, on tracking location and orientation of the user input device relative the display displaying the web page.

In some embodiments, a 2D image displayed within a web page may be identified. In addition, a 3D image with substantially equivalent content as compared to the content of the 2D image may be identified. The 2D image may be replaced by a flattened 3D image, where a z-scale value associated with a depth of the 3D image may be decreased to flatten the 3D image. Further, at least one user input manipulating the 3D image within the web page may be received. In some embodiments, the at least one user input may include movement of a view point (or point of view) of a user relative to a display displaying the web page. In some embodiments, the at least one user input may include detection of a beam projected from an end of a user input device (and/or an end of the user input device) intersecting with the 3D image. In some embodiment, the intersection with the 3D image may be based, at least in part, on tracking location and orientation of the user input device relative the display displaying the web page.

In some embodiments, a 2D image displayed within a web page may be identified. In addition, a 3D image with substantially equivalent content as compared to the content of the 2D image may be identified. The 3D image may be integrated into the web page, thereby replacing the 2D image with the 3D image. Further, at least one user input manipulating the 3D image within the web page may be received. In some embodiments, the at least one user input may include movement of a view point (or point of view) of a user relative to a display displaying the web page. In some embodiments, the at least one user input may include detection of a beam projected from an end of a user input device (and/or an end of the user input device) intersecting with the 3D image. In some embodiment, the intersection with the 3D image may be based, at least in part, on tracking location and orientation of the user input device relative the display displaying the web page. In some embodiments, upon receiving the at least one user input manipulating the 3D image within the web page, a determination that a real-world scale and/or size of the 3D image fits within the bounds of a web browser displaying the web page may be made and the 3D image may be displayed at the real-world scale and/or size.

In some embodiments, content of a 2D image displayed within a web page may be identified. The 2D image may be identified based on one of a web page structure analysis or identification of metadata associated with the 2D image. In addition, one or more three-dimensional (3D) images may be identified as possible replacements of the 2D image, e.g., based on content of the 2D image. The one or more 3D images may be ranked, e.g., based on one or more sets of ranking criteria. A 3D image with a highest-ranking value may be selected and integrated into the web page, thereby replacing the 2D image with the 3D image. Further, at least one user input manipulating the 3D image within the web page may be received. In some embodiments, the at least one user input may include movement of a view point (or point of view) of a user relative to a display displaying the web page. In some embodiments, the at least one user input may include detection of a beam projected from an end of a user input device (and/or an end of the user input device) intersecting with the 3D image. In some embodiment, the intersection with the 3D image may be based, at least in part, on tracking location and orientation of the user input device relative the display displaying the web page.

In some embodiments, content of a 2D image displayed within a web page may be identified and one or more three-dimensional (3D) images may be identified as possible replacements of the 2D image, e.g., based on content of the 2D image. The one or more 3D images may be ranked, e.g., based on one or more sets of ranking criteria. A 3D image with a highest-ranking value may be selected based on a ranking of the one or more 3D images, e.g., based on one or more sets of ranking criteria. Imagery of the 3D image that does not correspond to imagery of the 2D image may be identified and modified such that the modified imagery of the 3D image corresponds to imagery of the 2D image, thereby generating a modified 3D image. The modified 3D image may be integrated into the web page, thereby replacing the 2D image with the modified 3D image. Further, at least one user input manipulating the 3D image within the web page may be received. In some embodiments, the at least one user input may include movement of a view point (or point of view) of a user relative to a display displaying the web page. In some embodiments, the at least one user input may include detection of a beam projected from an end of a user input device (and/or an end of the user input device) intersecting with the modified 3D image. In some embodiment, the intersection with the modified 3D image may be based, at least in part, on tracking location and orientation of the user input device relative the display displaying the web page.

In some embodiments, content of a 2D image displayed within a web page may be identified and one or more three-dimensional (3D) images may be identified as possible replacements of the 2D image, e.g., based on content of the 2D image. The one or more 3D images may be ranked, e.g., based on one or more sets of ranking criteria. A 3D image with a highest-ranking value may be selected based on a ranking of the one or more 3D images, e.g., based on one or more sets of ranking criteria. Imagery of the 3D image that does not correspond to imagery of the 2D image may be identified and modified such that the modified imagery of the 3D image corresponds to imagery of the 2D image, thereby generating a modified 3D image. The modified 3D image may be integrated into the web page, thereby replacing the 2D image with the modified 3D image. Further, at least one user input manipulating the 3D image within the web page may be received. In some embodiments, the at least one user input may include movement of a view point (or point of view) of a user relative to a display displaying the web page. In some embodiments, the at least one user input may include detection of a beam projected from an end of a user input device (and/or an end of the user input device) intersecting with the modified 3D image. In some embodiments, the intersection with the modified 3D image may be based, at least in part, on tracking location and orientation of the user input device relative the display displaying the web page.

In some embodiments, a 2D image displayed within a web page may be identified. In addition, a 3D image with substantially equivalent content as compared to the content of the 2D image may be identified. Imagery of the 3D image that does not correspond to imagery of the 2D image may be identified and modified such that the modified imagery of the 3D image corresponds to imagery of the 2D image, thereby generating a modified 3D image. The modified 3D image may be integrated into the web page, thereby replacing the 2D image with the modified 3D image. Further, at least one user input manipulating the 3D image within the web page may be received. In some embodiments, the at least one user input may include movement of a view point (or point of view) of a user relative to a display displaying the web page. In some embodiments, the at least one user input may include detection of a beam projected from an end of a user input device (and/or an end of the user input device) intersecting with the modified 3D image. In some embodiment, the intersection with the modified 3D image may be based, at least in part, on tracking location and orientation of the user input device relative the display displaying the web page.

BRIEF DESCRIPTION OF THE DRAWINGS

A better understanding of the present disclosure can be obtained when the following detailed description of the preferred embodiment is considered in conjunction with the following drawings, in which:

FIG. 2C illustrates an example of a schematic diagram of a nematic liquid crystalline phase, according to implementations.

FIG. 2D illustrates an example of a schematic diagram of a switching of a liquid crystal molecule in an electric field, according to implementations.

FIG. 2E illustrates an example of a schematic diagram of a configuration of liquid crystal molecules within a conventional twisted nematic liquid crystal based polarization rotator, according to implementations.

Figure 1:
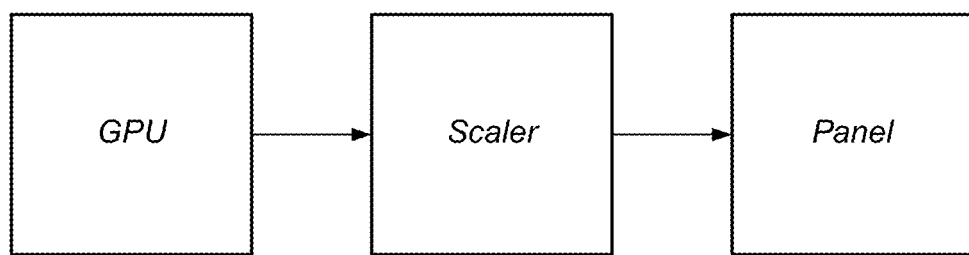
FIG. 1 illustrates a modern display chain, according to implementations.
Figure 2A:
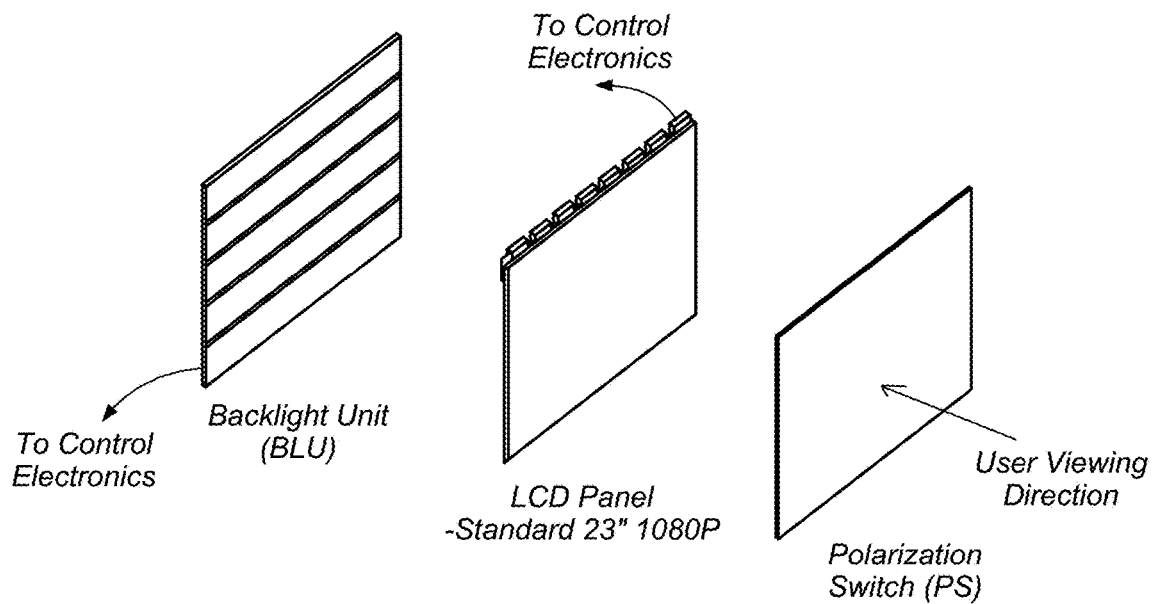
FIG. 2A illustrates an example of an architecture that utilizes a polarization switch, according to implementations.
Figure 2B:
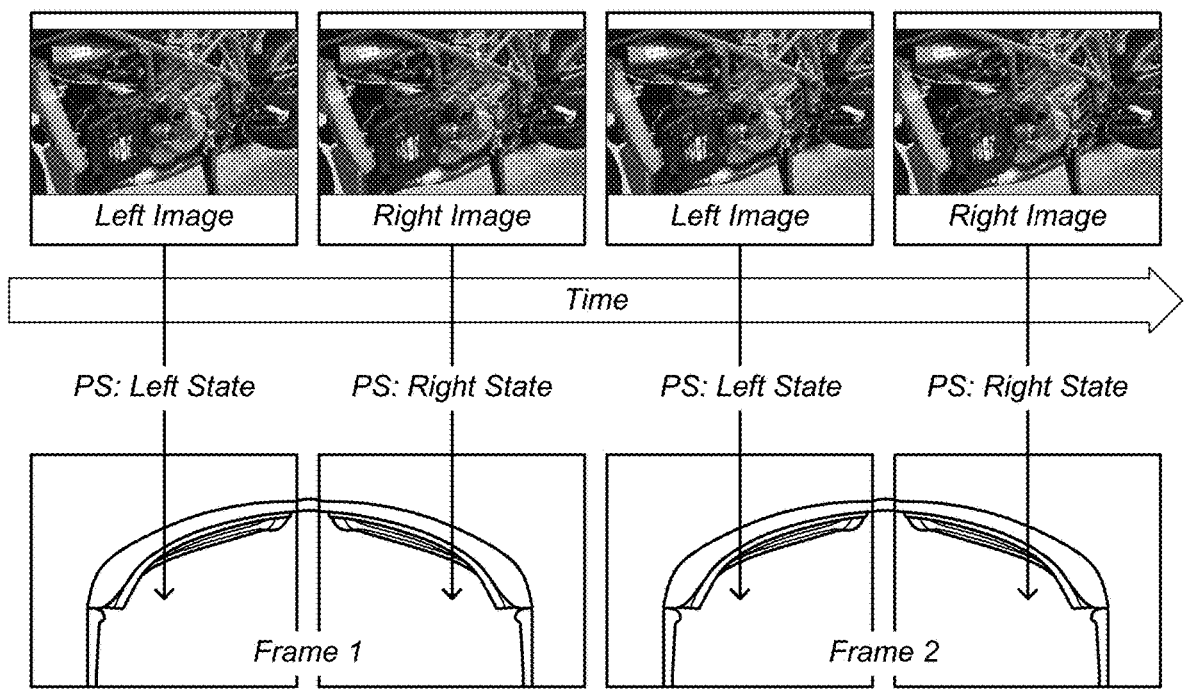
FIG. 2B illustrates an example of a stereo effect (simulated 3D) using polarization switching between left and right views, according to implementations.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Terms

The following is a glossary of terms used in the present application:

Memory Medium—any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, EEPROM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, tablet, or other device or combinations of devices. In general, the term "computer system" can be broadly defined to encompass any device (or combination of devices) having at least one processor that executes instructions from a memory medium.

Graphical Processing Unit—refers to a component that may reside on a personal computer, workstation, server, graphics server, or equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element (or Functional Unit)—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Figure 4:
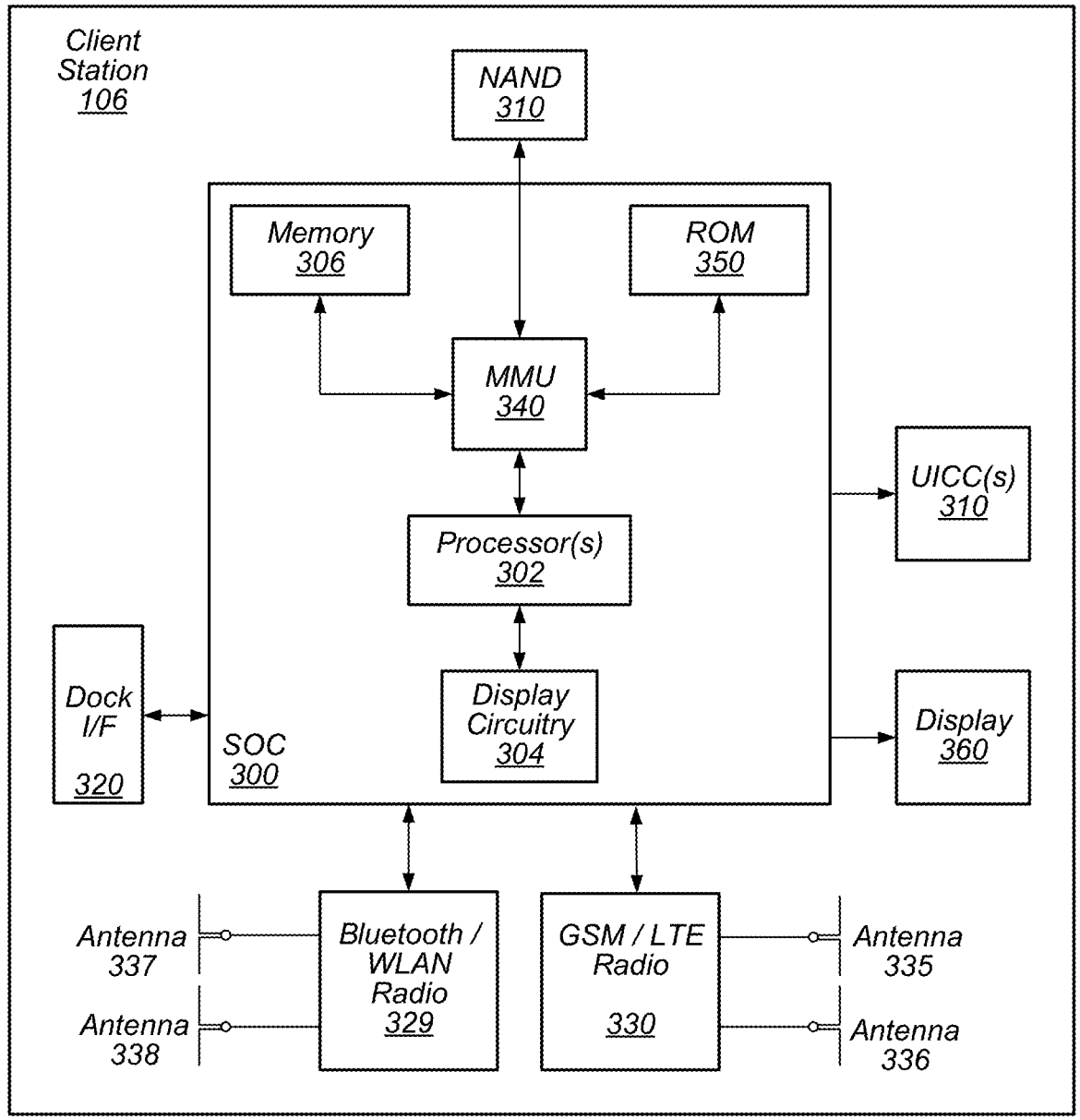
FIG. 4 illustrates an example block diagram of a user equipment device configured according to some embodiments.

Coupled Zone—refers to a physical volume in which the user of a 3D stereoscopic display can view 3D content within the human eye's natural depth of field. As shown in FIG. 4, when a person sees an object in the physical world, the person's eyes converge on, or look (individually aim) at, the object. Additionally, as the two eyes converge on the object, each eye's lens also focuses, via accommodation, (monoscopically) on the object. In this sense, both eyes focus and converge on the object, thus focus and convergence are "coupled."

Disparity—refers to the difference between the left eye and right eye images of a 3D stereoscopic display. Disparity may be described in at least two ways. First, with respect to the display device, i.e., the 3D stereoscopic display, disparity may be described by the number of pixels of separation between corresponding positions of the image, or content, being displayed, or rendered. In other words, the pixels of separation between the left eye and right eye images, or content. Alternatively, or in addition to, with respect to the point of view of the user, disparity may be described by the degree of angular separation between corresponding positions in the images, or content, being displayed, or rendered, i.e., the angular separation between the left eye and right eye images, or content.

Projection—refers the display of a 3D object, or content, on a two-dimensional (2D) display. Thus, a projection may be described as the mathematical function applied to objects within a virtual 3D scene to determine the virtual position of the objects within a 3D space that may be defined by the size of the 3D stereoscopic display and the point of view of a user.

Viewpoint—This term has the full extent of its ordinary meaning in the field of computer graphics/cameras and specifies a location and/or orientation. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below) or "physical viewpoint". The term "virtual viewpoint" refers to a viewpoint from within a virtual representation or 3D scene. A viewpoint is synonymous with "point of view" (POV). (See definition of POV below.)

Eyepoint—the physical location (and/or orientation) of a single eye or a pair of eyes. A viewpoint above may correspond to the eyepoint of a person. For example, a person's eyepoint has a corresponding viewpoint.

Point of View (POV)—refers to or specifies a position and orientation. For example, a POV may be a viewpoint or eyepoint, generally of a user, but may also be a viewpoint of an optical device, such as a camera. The POV is generally a means to capture a relationship between two or more 6 degree of freedom objects. In a typical application of the present techniques, a user's pair of eyes or head (view) is positioned in any X, Y, Z position and/or pitch, yaw, roll orientation to a display device, e.g., a monitor screen, which may have its own position in any X, Y, Z position and/or pitch, yaw, roll orientation. In this example, the POV can be defined as the position/orientation of the user's view with respect to the positioning/orientation of the display device. The POV determination may be identified by a capture system. In a typical application of the present techniques, one or more tracking devices are attached to the display device, such that the controller knows what the tracking system tracks in the context of the display device, meaning the tracking system, being attached to the display device, is programmatically aware of the position/orientation of the display device, as well as any potential change to the position/orientation of the display device.

The tracking system (which may identify and track, among other things, the user's view) may identify the position/orientation of the user's view, and this information may then be correlated to the tracking system's identification of the viewing device's position/orientation (again, with respect to the display device).

Vertical Perspective—a perspective effect rendered from a viewpoint which is substantially perpendicular to the display surface. "Substantially perpendicular" refers to 90 degrees or variations thereof, such as 89 or 91 degrees, 85-95 degrees, or any variation which does not cause noticeable distortion of the rendered scene. A vertical perspective may be a central perspective, e.g., having a single (and central) vanishing point. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints.

Horizontal or Oblique Perspective—a perspective effect rendered from a viewpoint which is not perpendicular to the display surface. More particularly, the term "horizontal perspective" may typically refer to a perspective effect which is rendered using a substantially 45-degree angled render plane in reference to the corresponding viewpoint. The rendering may be intended for a display which may be positioned horizontally (e.g., parallel to a table surface or floor) in reference to a standing viewpoint. "Substantially 45 degrees" may refer to 45 degrees or variations thereof, such as 44 and 46 degrees, 40-50 degrees, or any variation which may cause minimal distortion of the rendered scene. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the horizontal perspective, but with differing single viewpoints.

Another conception of the horizontal perspective as commonly used in embodiments of the present techniques relates to the projection of the intended rendered graphics to the viewing device. With the POV determined, a horizontal perspective engine may identify the correct graphics frustum in the 3D space, taking into account the position and orientation of the viewing device as defining the render plane of the frustum and the user's view in position and orientation to define a camera point of the frustum in relation to the render plane. The resultant projection is then rendered onto the viewing device as will be seen by the user.

Position—the location or coordinates of an object (either virtual or real). For example, position may include x, y, and z (i.e., location) coordinates within a defined space. The position may be relative or absolute, as desired. Position may also include yaw, pitch, and roll information, e.g., when defining the orientation of a viewpoint. In other words, position is defined broadly so as to encompass information regarding both location and orientation.

Stylus—a peripheral device or element such as a handheld device, handheld pen device, handheld pointing device, hand, finger, glove, or any object used to directly interact with rendered virtual objects as in a stereo rendered virtual projected objects.

Similar—as used herein in reference to geometrical shapes, refers to the geometrical term indicating that objects have the same shape, or that one object has the same shape as the mirror image of the other object. In other words, objects are considered similar if one object may be obtained from the other by uniformly scaling (enlarging or shrinking) the object. Additionally, the term similar, or similar objects, means that either object may be rescaled, repositioned, and reflected, so as to coincide with the other object. Thus, for example, if a first object is geometrically similar to a second object, i.e., has the same shape but possibly a different size, then either object may be uniformly scaled to obtain the geometrical size and shape of the other object. Thus, the first object may be uniformly scaled to obtain the second object or the second object may be uniformly scaled to obtain the first object. Note that this definition of similar only refers to the use of the word in the context of geometrical shapes and retains it ordinary meaning in other contexts (e.g., system A is similar to system B implies that system A resembles system B without being identical to system B).

Approximately—refers to a value that is correct or exact within some specified tolerance. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application.

Proximate—near to; for example, proximate may mean within some specified distance, or within some specified fraction of a distance. Note that the actual threshold for being proximate is generally application dependent. Thus, in various applications, proximate may mean being within 1 mm, 1 inch, 1 foot, 1 meter, 1 mile, etc. of some reference point or object, or may refer to being within 1%, 2%, 5%, 10%, etc., of a reference distance from some reference point or object.

Substantially—refers to a term of approximation. Similar to the term "approximately," substantially is meant to refer to some tolerable range. Thus, if part A is substantially horizontal, then part A may be horizontal (90 degrees from vertical), or may be within some tolerable limit of horizontal. For example, in one application, a range of 89-91 degrees from vertical may be tolerable, whereas, in another application, a range of 85-95 degrees from vertical may be tolerable. Further, it may be that the tolerable limit is one-sided. Thus, using the example of "part A is substantially horizontal," it may be tolerable for Part A to be in a range of 60-90 degrees from vertical, but not greater than 90 degrees from vertical. Alternatively, it may be tolerable for Part A to be in a range of 90-120 degrees from vertical but not less than 90 degrees from vertical. Thus, the tolerable limit, and therefore, the approximation referenced by use of the term substantially may be as desired or as required by the particular application.

Equivalent—refers to an object that is equal to or corresponds with another object in value, measure, function, meaning, effect, significance, appearance, and so forth. For example, a first image may be equivalent to a second image if imagery within the first image corresponds to imagery within the second image. Additionally, a first image may be substantially equivalent to a second image if imagery within the first image at least partially corresponds to imagery with the second image, e.g., within some tolerable range and/or limit.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Comprising—this term is open-ended, and means "including."". As used in the appended claims, this term does not foreclose additional elements, structure, or steps. Consider a claim that recites: "A system comprising a display . . . "; such a claim does not foreclose the system from including additional components (e.g., a voltage source, a light source, etc.).

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

First, Second, etc.—these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

This specification may include references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

FIGS. 3-6 Exemplary Systems

Figure 3A:
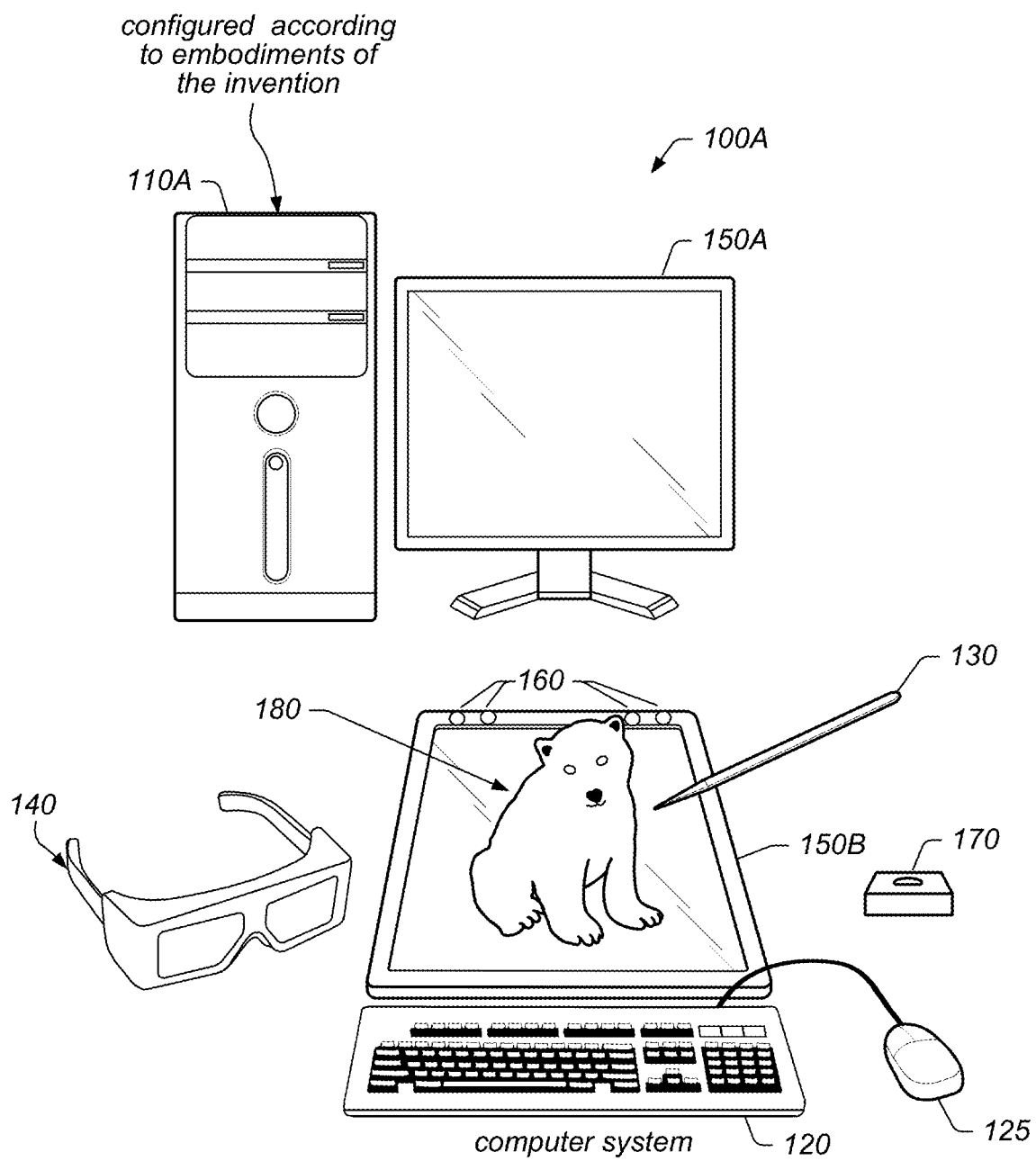
FIGS. 3A and 3B illustrate examples of 3D stereoscopic display systems configured according to some embodiments.
Figure 3B:
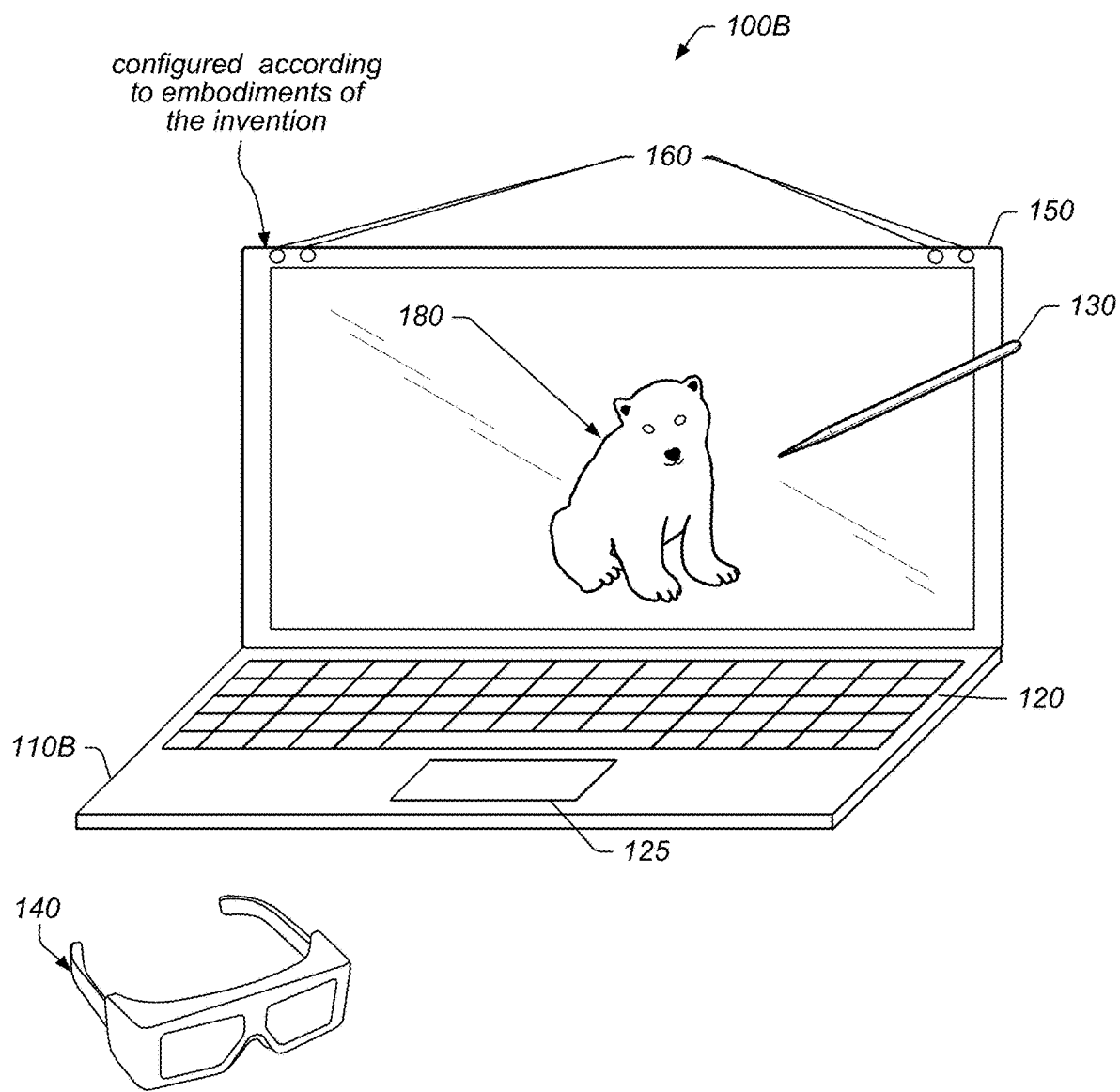

FIGS. 3A and 3B illustrate exemplary systems configured to implement various embodiments of the techniques described below.

In the exemplary embodiment of FIG. 3A, computer system 100A may include chassis 110A, display 150A and display 150B (which may collectively be referred to as display 150 or "one or more displays" 150), keyboard 120, mouse 125, user input device 130, eyewear 140, at least two cameras 160, and caddy 170. Note that in some embodiments, two displays 150A and 150B may not be used; instead, for example, a single display 150 may be used. In various embodiments, at least one of the displays 150A and 150B may be a stereoscopic display. For example, in one embodiment, both of the displays 150A and 150B may be stereoscopic displays. Or, in other embodiments, the single display 150 may be a stereoscopic display. It is noted that a stereoscopic display may also be configured to display two-dimensional (2D) objects and may be configured to operate in a 2D mode.

The chassis 110A may include various computer components such as processors, at least one memory medium (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform some of the techniques described herein. In certain embodiments, the graphics engine may be implemented on or by a functional unit or processing element. As used herein, and as noted in the Terms section above, the term functional unit or processing element refers to any of various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The memory medium (which may include two or more memory mediums) may also store data (and/or program instructions) (e.g., implementing or specifying a computer model) representing a virtual space, which may be used for projecting a 3D scene, such as scene 180, of the virtual space via the display(s) 150. Further, the memory medium may store software which is executable to perform three-dimensional spatial tracking (e.g., user view tracking, user control tracking, etc.), content processing, or other features, as described herein. For example, the computer system may include a tracking system that may track one or more of a user's head, a user's hand, or the stylus. Additionally, the memory medium may store operating system software, as well as other software for operation of the computer system. Various embodiments further include receiving or storing instructions and/or data implemented in accordance with the foregoing description upon a carrier medium.

As indicated above, the computer system 100A may be configured to display a three-dimensional (3D) scene (e.g., via stereoscopic images), or 3D content, such as scene 180, using the display 150A and/or the display 150B. The computer system 100A may also be configured to display a "view" of the 3D scene using the display 150A, the display 150B, and/or another display, as described in more detail below. The "view" of the 3D scene, or content, may refer to a displayed portion of the 3D scene from a viewpoint within the 3D scene. A viewpoint within the 3D scene may be referred to as a "virtual viewpoint." The view may be stereoscopic, e.g., may be displayed on a stereoscopic display. Alternatively, the view may be monoscopic (not stereoscopic), and may be displayed on either a monoscopic display or a stereoscopic display. Note that a monoscopic image or scene displayed on a stereoscopic display may appear the same as on a monoscopic display system.

It should be noted that the embodiment of FIG. 3A is exemplary only, and other numbers of displays are also envisioned. For example, the computer system 100A may include only a single display or more than two displays, or the displays may be arranged in different manners than shown, e.g., as goggles or other wearable eyewear or headgear as further described below in reference to FIG. 5. In this particular embodiment, the display 150A is configured as a vertical display (which may be perpendicular or approximately perpendicular to a user's line of sight) and the display 150B is configured as a horizontal display (which may be parallel (or approximately parallel) or oblique to a user's line of sight). The vertical display 150A may be used (e.g., via instructions sent by a graphics engine executing in the chassis 110A) to provide images which are presented according to a vertical (or central) perspective and the display 150B may be used (e.g., via instructions sent by a graphics engine executing in the chassis 110A) to provide images that are presented according to a horizontal perspective. Descriptions of horizontal and vertical perspectives are provided herein (see, e.g., the above Terms section). Additionally, while the displays 150 are shown as flat panel displays, in other embodiments, they may be any type of device or system which is capable of displaying images, e.g., projection systems. For example, display(s) 150 may be or include a CRT (cathode ray tube) monitor, a LCD (liquid crystal display) monitor, or a front projection or a back projection screen or surface with a plurality of projectors, among others. Display(s) 150 may include a light emitting diode (LED) backlight or other type of backlight.

Either or both of the displays 150A and 150B may present (display) stereoscopic images for viewing by the user. By presenting stereoscopic images, the display(s) 150 may present a 3D scene for the user. This 3D scene may be considered or referred to as an illusion or simulated 3D because the actual provided images are 2D, but the scene is conveyed in 3D via the user's interpretation of the provided images via stereoscopic effects. In order to properly view the stereoscopic images (one for each eye for each image frame), the user may wear eyewear 140. Eyewear 140 may be any of anaglyph glasses, polarized glasses, shutter glasses, lenticular glasses, etc., among others. In some embodiments, the display(s) 150 may be included (or incorporated) in the eyewear (or other wearable headgear). In embodiments using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens of the eyewear has the corresponding orthogonal polarization for receiving the corresponding image. With shutter glasses, each lens is synchronized with respect to left and right eye images provided by the display(s) 150, e.g., in alternating fashion. The display may provide both polarizations simultaneously or in an alternating manner (e.g., sequentially), as desired. Thus, the left eye may be allowed to only see left eye images during the left eye image display time and the right eye may be allowed to only see right eye images during the right eye image display time. With lenticular glasses, images form on cylindrical lens elements or a two-dimensional array of lens elements. The stereoscopic image may be provided via optical methods, where left and right eye images are provided only to the corresponding eyes using optical means such as prisms, mirror(s), lens(es), and the like. Large convex or concave lenses can also be used to receive two separately projected images to the user.

In one embodiment, eyewear 140 may be used as a position input device to track the user view (e.g., eyepoint or point of view (POV)) of a user viewing a 3D scene presented by the system 100A. For example, eyewear 140 may provide information (e.g., position information, which includes orientation information, etc.) that is usable to determine the position of the point of view of the user, e.g., via triangulation. In some embodiments, the position input device may use a light sensitive detection system, e.g., may include an infrared detection system, to detect the position of the viewer's head to allow the viewer freedom of head movement. Other embodiments of the input device(s) may use the triangulation method of detecting the viewer point of view location, such as one or more sensors (e.g., two cameras, such as charge coupled-device (CCD) or complementary metal oxide semiconductor (CMOS) cameras) providing position data suitable for the head tracking. The input device(s), such as a stylus, keyboard, mouse, trackball, joystick, or the like, or combinations thereof, may be manually operated by the viewer to specify or indicate the correct display of the horizontal perspective display images. However, any method for tracking the position of the user's head or point of view may be used as desired. Accordingly, the 3D scene may be rendered from the perspective (or point of view) of the user such that the user may view the 3D scene with minimal distortions (e.g., since it is based on the point of view of the user). Thus, the 3D scene may be particularly rendered for the point of view of the user, using the position input device.

The relationships among the position of the display(s) 150 and the point of view of the user may be used to map a portion of the virtual space to the physical space of the system 100A. In essence, the physical space and components used may be mapped to the virtual model in order to accurately render a 3D scene of the virtual space.

One or more of the user input devices (e.g., the keyboard 120, the mouse 125, the user input device 130, pointing device, user control device, user hand/fingers, etc.) may be used to interact with the presented 3D scene. For example, the user input device 130 (shown as a stylus) or simply the user's hands may be used to directly interact with virtual objects of the 3D scene (via the viewed projected objects). Such direct interaction may be possible with negative space portions of the 3D scene. In some embodiments, at least a portion of the 3D scene may be presented in this negative space, which is in front of or otherwise outside of the at least one display, via stereoscopic rendering (of the 3D scene). In some embodiments, at least a portion of the 3D scene may appear as a hologram-like image above the surface of the display 150. For example, when the horizontal display 150B is used, the 3D scene may be seen as hovering above the horizontal display. It should be noted, however, that a portion of the 3D scene may also be presented as appearing behind the display surface, which is in positive space Thus, negative space refers to a space which the user is able to freely move in and interact with (e.g., where the user is able to place his hands (or more generally, user input device 130) in the space), as opposed to a space the user cannot freely move in and interact with (e.g., where the user is not able to place his hands (or a user input device 130) in the space, such as below the display surface). Thus, negative space may be considered to be a "hands-on volume" as opposed to an "inner-volume" (i.e., positive space), which may be under the surface of the display(s), and thus not accessible. Thus, the user may interact with virtual objects in the negative space because they are proximate to the user's own physical space. Said another way, the positive space is located behind (or under) the viewing surface, and so presented objects appear to be located inside (or on the back side of) the physical viewing device. Thus, objects of the 3D scene presented within the positive space do not share the same physical space with the user and the objects therefore cannot be directly and physically manipulated by hands or physically intersected by hand-held tools such as user input device 130. Rather, they may be manipulated indirectly, e.g., via a computer mouse, a joystick, virtual representations of hands, handheld tools, or a stylus, or by projections from the stylus (e.g., a virtual laser or a virtual plane).

In some embodiments, system 100A may include one or more sensors 160. The one or more sensors 160 may be included in a tracking system. FIG. 3 illustrates an embodiment using four cameras 160. For instance, two of the four cameras 160 may be used to sense a user view (e.g., point of view) and the other two cameras 160 may be used to sense a user input device (e.g., pointing device, stylus, hand, glove, etc.). Alternatively, fewer than four sensors may be used (e.g., two sensors), wherein each sensor may track both the user (e.g., the user's head and/or the user's point of view) and the user input device. Sensors 160 may be used to image a user of system 100A, track a user's movement, or track a user's head or eyes, among other contemplated functions. In one embodiment, cameras 160 may track a position and/or an orientation of user input device 130. The information regarding the position (including the orientation) of the user input device 130 provided by the one or more sensors 160 may be used in conjunction with other positional information of the system (e.g., an accelerometer and/or gyroscope within the stylus itself) to perform more precise 3D tracking of the user input device 130. The one or more sensors 160 may be spatially separated from one another and placed in a position to view a volume that encompasses where a user will view stereo imagery. Sensors 160 may also be far enough apart from each other to provide for a separation of view for a true three-axis triangulation determination. System 100A may also include a caddy 170 to store user input device 130. Caddy 170 may also be used to calibrate the orientation of the stylus to a known roll, pitch, and yaw, and so may be in a fixed position relative to cameras 160.

In one embodiment, the system 100A may be configured to couple to a network, such as a wide area network, via an input. The input may be configured to receive data (e.g., image data, video data, audio data, etc.) over the network from a system similar to system 100A. In other embodiments, a tracking system may include cameras 160. Cameras 160 may be configured to provide visual information regarding a user (e.g., such that a POV, e.g., the position (including the orientation), of the user may be determined or such that a position of the user's hand may be determined). However, it should be noted that any type of various tracking techniques or devices may be used as desired. Note that as used herein, POV of a user refers to the perspective or POV from which a user optically views an object or image, i.e., a user's visual POV, and thus is defined with respect to the display device of the system. In some embodiments, the POV may be a 6 degree of freedom (6DOF) POV, e.g., three location coordinates and three orientation coordinates, although any POV may be used as desired, e.g., three location coordinates and two or three orientation coordinates, and so forth. As noted above, position coordinates may include both location and orientation coordinates.

Note that in some embodiments, the tracking system may rely at least in part on the components of chassis 110A to determine a position or a POV, e.g., via execution of one more programs by or on a processor or functional unit of chassis 110A, although in other embodiments the tracking system may operate independently, e.g., may have its own processor or functional unit.

In certain embodiments, the system may include components implementing a perspective based image capture system, for capturing images of a target object at a location remote from the system. For example, the perspective based image capture system may include an input configured to couple to a network for receiving information regarding a point of view (POV) from a tracking system at a remote location. The information regarding the POV may indicate a position of a remote user. The perspective based image capture system may further include another image capture system for capturing images of a target object. More specifically, the image capture system may be configured to capture one or more images from a first perspective based on the information regarding the POV received by the input.

The user may be able to specify or otherwise manipulate a virtual viewpoint within the 3D scene presented by the display(s) 150. A view of the 3D scene may be presented based on the virtual viewpoint, either by one or more of the display(s) 150 or another display, as desired. This view of the 3D scene may be stereoscopic or monoscopic, as desired.

A 3D scene generator (e.g., content processing system) stored and executed in the chassis 110A may be configured to dynamically change the displayed images provided by the display(s) 150. More particularly, the 3D scene generator may update the displayed 3D scene based on changes in the user view, user control (e.g., manipulations via the user input devices), etc. Such changes may be performed dynamically at run-time, and may be performed in real time. The 3D scene generator may also keep track of peripheral devices (e.g., user input device 130 or eyewear 140) to ensure synchronization between the peripheral device and the displayed image. The system may further include a calibration unit, procedure, and/or fiducial markers to ensure proper mapping of the peripheral device to the display images and proper mapping between the projected images and the virtual images stored in the memory of the chassis 110A.

Thus, the system 100A may present a 3D scene with which the user may interact in real time. The system may include real-time electronic display(s) 150 that may present or convey perspective images in the open space, and user input device 130 that may allow the user to interact with the 3D scene with hand controlled or hand-held tools. The system 100A may also include means to manipulate the displayed image in various ways, such as magnification, zoom, rotation, or movement, or even to display a new image. However, as noted above, in some embodiments, the system may facilitate such manipulations via the user's hands, e.g., without hand-held tools.

Further, while the system 100A is shown as including horizontal display 150B because it simulates the user's visual experience with the horizontal ground, other viewing surfaces may offer similar 3D illusion experiences. For example, the 3D scene may appear to be hanging from a ceiling by projecting the horizontal perspective images onto a ceiling surface, or may appear to be floating from a wall by projecting horizontal perspective images onto a vertical wall surface. More generally, any other variations in display orientation and perspective (or any other configuration of the system 100A) may be used as desired.

According to various embodiments of the present disclosure, the display 150 may display various types of information (for example, multimedia data or text data) to be provided to the user. The display 150 may be configured to include a liquid crystal display (LCD), a light emitting diode (LED) display, an organic LED (OLED) display, a plasma cell display, an electronic ink array display, an electronic paper display, a flexible LCD, a flexible electrochromic display, or a flexible electro wetting display. The display 150 may be connected functionally to an element(s) of the electronic device. Also, the display 150 may be connected functionally to an electronic device(s) other than the electronic device.

In the exemplary embodiment of FIG. 3B, computer system 100B may include chassis 110B which may include display 150, keyboard 120, trackpad or touchpad 135, and at least two cameras 160. The computer system 100B may also include user input device 130 and eyewear 140. Note that in some embodiments, computer system 100B may be wireless or mobile station, e.g., such as a wireless station 106 further described below. For example, computer system 100B may be or included on mobile telephones or smart phones (e.g., iPhone™, Android™-based phones), tablet computers (e.g., iPad™, Samsung Galaxy™, etc.), laptop computers (e.g., MacBook™), portable gaming devices (e.g., Nintendo DS™, PlayStation Portable™, Gameboy Advance™, iPhone™), portable Internet devices, and/or other handheld devices. In various embodiments, at least one of the display 150 may be a stereoscopic display. It is noted that a stereoscopic display may also be configured to display two-dimensional (2D) objects and may be configured to operate in a 2D mode.

The chassis 110B may include various computer components such as processors, at least one memory medium (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform some of the techniques described herein. In certain embodiments, the graphics engine may be implemented on or by a functional unit or processing element. As used herein, and as noted in the Terms section above, the term functional unit or processing element refers to any of various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The memory medium (which may include two or more memory mediums) may also store data (and/or program instructions) (e.g., implementing or specifying a computer model) representing a virtual space, which may be used for projecting a 3D scene, such as scene 180, of the virtual space via the display(s) 150. Further, the memory medium may store software which is executable to perform three-dimensional spatial tracking (e.g., user view tracking, user control tracking, etc.), content processing, or other features, as described herein. For example, the computer system may include a tracking system that may track one or more of a user's head, a user's hand, or the stylus. Additionally, the memory medium may store operating system software, as well as other software for operation of the computer system. Various embodiments further include receiving or storing instructions and/or data implemented in accordance with the foregoing description upon a carrier medium.

As indicated above, the computer system 100B (or more specifically, chassis 110B) may be configured to display a three-dimensional (3D) scene (e.g., via stereoscopic images), or 3D content, such as scene 180, using the display 150. The computer system 100B may also be configured to display a "view" of the 3D scene using the display 150. The "view" of the 3D scene, or content, may refer to a displayed portion of the 3D scene from a viewpoint within the 3D scene. A viewpoint within the 3D scene may be referred to as a "virtual viewpoint." The view may be stereoscopic, e.g., may be displayed on a stereoscopic display. Alternatively, the view may be monoscopic (not stereoscopic), and may be displayed on either a monoscopic display or a stereoscopic display. Note that a monoscopic image or scene displayed on a stereoscopic display may appear the same as on a monoscopic display system.

In some embodiments, the display 150 may present a 3D scene for the user. This 3D scene may be considered or referred to as an illusion or simulated 3D because the actual provided images are 2D, but the scene is conveyed in 3D via the user's interpretation of the provided images via stereoscopic effects. In order to properly view the stereoscopic images (one for each eye for each image frame), the user may wear eyewear 140. Eyewear 140 may be any of anaglyph glasses, polarized glasses, shutter glasses, lenticular glasses, etc., among others.

In some embodiments, eyewear 140 may be used as a position input device to track the user view (e.g., eyepoint or point of view (POV)) of a user viewing a 3D scene presented by the system 100B. For example, eyewear 140 may provide information (e.g., position information, which includes orientation information, etc.) that is usable to determine the position of the point of view of the user, e.g., via triangulation. In some embodiments, the position input device may use a light sensitive detection system, e.g., may include an infrared detection system, to detect the position of the viewer's head to allow the viewer freedom of head movement. Other embodiments of the input device(s) may use the triangulation method of detecting the viewer point of view location, such as one or more sensors (e.g., two cameras, such as charge coupled-device (CCD) or complementary metal oxide semiconductor (CMOS) cameras) providing position data suitable for the head tracking. The input device(s), such as a stylus, keyboard, mouse, trackball, joystick, or the like, or combinations thereof, may be manually operated by the viewer to specify or indicate the correct display of the horizontal perspective display images. However, any method for tracking the position of the user's head or point of view may be used as desired. Accordingly, the 3D scene may be rendered from the perspective (or point of view) of the user such that the user may view the 3D scene with minimal distortions (e.g., since it is based on the point of view of the user). Thus, the 3D scene may be particularly rendered for the point of view of the user, using the position input device.

The relationships among the position of the display 150 and the point of view of the user may be used to map a portion of the virtual space to the physical space of the system 100B. In essence, the physical space and components used may be mapped to the virtual model in order to accurately render a 3D scene of the virtual space.

One or more of the user input devices (e.g., the keyboard 120, the trackpad 135, the user input device 130, pointing device, user control device, user hand/fingers, etc.) may be used to interact with the presented 3D scene. For example, the user input device 130 (shown as a stylus) or simply the user's hands may be used to directly interact with virtual objects of the 3D scene (via the viewed projected objects). Such direct interaction may be possible with negative space portions of the 3D scene. In some embodiments, at least a portion of the 3D scene may be presented in this negative space, which is in front of or otherwise outside of the at least one display, via stereoscopic rendering (of the 3D scene). In some embodiments, at least a portion of the 3D scene may appear as a hologram-like image above the surface of the display 150. It should be noted, however, that a portion of the 3D scene may also be presented as appearing behind the display surface, which is in positive space Thus, negative space refers to a space which the user is able to freely move in and interact with (e.g., where the user is able to place his hands (or more generally, user input device 130) in the space), as opposed to a space the user cannot freely move in and interact with (e.g., where the user is not able to place his hands (or a user input device 130) in the space, such as below the display surface). Thus, negative space may be considered to be a "hands-on volume" as opposed to an "inner-volume" (i.e., positive space), which may be under the surface of the display(s), and thus not accessible. Thus, the user may interact with virtual objects in the negative space because they are proximate to the user's own physical space. Said another way, the positive space is located behind (or under) the viewing surface, and so presented objects appear to be located inside (or on the back side of) the physical viewing device. Thus, objects of the 3D scene presented within the positive space do not share the same physical space with the user and the objects therefore cannot be directly and physically manipulated by hands or physically intersected by hand-held tools such as user input device 130. Rather, they may be manipulated indirectly, e.g., via a computer mouse, a joystick, virtual representations of hands, handheld tools, or a stylus, or by projections from the stylus (e.g., a virtual laser or a virtual plane).

In some embodiments, system 100 may include one or more sensors 160. The one or more sensors 160 may be included in a tracking system. FIG. 3B illustrates an embodiment using four cameras 160. For instance, two of the four cameras 160 may be used to sense a user view (e.g., point of view) and the other two cameras 160 may be used to sense a user input device (e.g., pointing device, stylus, hand, glove, etc.). Alternatively, fewer than four sensors may be used (e.g., two sensors), wherein each sensor may track both the user (e.g., the user's head and/or the user's point of view) and the user input device. Sensors 160 may be used to image a user of system 100B, track a user's movement, or track a user's head or eyes, among other contemplated functions. In one embodiment, cameras 160 may track a position and/or an orientation of user input device 130. The information regarding the position (including the orientation) of the user input device 130 provided by the one or more sensors 160 may be used in conjunction with other positional information of the system (e.g., an accelerometer and/or gyroscope within the stylus itself) to perform more precise 3D tracking of the user input device 130. The one or more sensors 160 may be spatially separated from one another and placed in a position to view a volume that encompasses where a user will view stereo imagery. Sensors 160 may also be far enough apart from each other to provide for a separation of view for a true three-axis triangulation determination.

In some embodiments, the system 100B may be configured to couple to a network, such as a wide area network, via an input or interface (wired or wireless). The input may be configured to receive data (e.g., image data, video data, audio data, etc.) over the network from a system similar to systems 100A or 100B. In other embodiments, a tracking system may include cameras 160. Cameras 160 may be configured to provide visual information regarding a user (e.g., such that a POV, e.g., the position (including the orientation), of the user may be determined or such that a position of the user's hand may be determined). However, it should be noted that any type of various tracking techniques or devices may be used as desired. Note that as used herein, POV of a user refers to the perspective or POV from which a user optically views an object or image, i.e., a user's visual POV, and thus is defined with respect to the display device of the system. In some embodiments, the POV may be a 6 degree of freedom (6DOF) POV, e.g., three location coordinates and three orientation coordinates, although any POV may be used as desired, e.g., three location coordinates and two or three orientation coordinates, and so forth. As noted above, position coordinates may include both location and orientation coordinates.

Note that in some embodiments, the tracking system may rely at least in part on the components of chassis 110B to determine a position or a POV, e.g., via execution of one more programs by or on a processor or functional unit of chassis 110B, although in other embodiments the tracking system may operate independently, e.g., may have its own processor or functional unit.

In certain embodiments, the system may include components implementing a perspective based image capture system, for capturing images of a target object at a location remote from the system. For example, the perspective based image capture system may include an input configured to couple to a network for receiving information regarding a point of view (POV) from a tracking system at a remote location. The information regarding the POV may indicate a position of a remote user. The perspective based image capture system may further include another image capture system for capturing images of a target object. More specifically, the image capture system may be configured to capture one or more images from a first perspective based on the information regarding the POV received by the input.

The user may be able to specify or otherwise manipulate a virtual viewpoint within the 3D scene presented by the display 150. A view of the 3D scene may be presented based on the virtual viewpoint, either by one or more of the display 150 or another display, as desired. This view of the 3D scene may be stereoscopic or monoscopic, as desired.

A 3D scene generator (e.g., content processing system) stored and executed in the chassis 110B may be configured to dynamically change the displayed images provided by the display 150. More particularly, the 3D scene generator may update the displayed 3D scene based on changes in the user view, user control (e.g., manipulations via the user input devices), etc. Such changes may be performed dynamically at run-time, and may be performed in real time. The 3D scene generator may also keep track of peripheral devices (e.g., user input device 130 or eyewear 140) to ensure synchronization between the peripheral device and the displayed image. The system may further include a calibration unit, procedure, and/or fiducial markers to ensure proper mapping of the peripheral device to the display images and proper mapping between the projected images and the virtual images stored in the memory of the chassis 110B.

Thus, the system 100B may present a 3D scene with which the user may interact in real time. The system may include real-time electronic display 150 that may present or convey perspective images in the open space, and user input device 130 that may allow the user to interact with the 3D scene with hand controlled or hand-held tools. The system 100B may also include means to manipulate the displayed image in various ways, such as magnification, zoom, rotation, or movement, or even to display a new image. However, as noted above, in some embodiments, the system may facilitate such manipulations via the user's hands, e.g., without hand-held tools.

According to various embodiments of the present disclosure, the display 150 may display various types of information (for example, multimedia data or text data) to be provided to the user. The display 150 may be configured to include a liquid crystal display (LCD), a light emitting diode (LED) display, an organic LED (OLED) display, a plasma cell display, an electronic ink array display, an electronic paper display, a flexible LCD, a flexible electrochromic display, or a flexible electro wetting display. The display 150 may be connected functionally to an element(s) of the electronic device. Also, the display 150 may be connected functionally to an electronic device(s) other than the electronic device. According to various embodiments of the present disclosure, the input module 240 may receive an input for controlling an attribute of, for example, a history screen. The input module 240 may receive, for example, an input of 'reference screen setting'. 'Reference screen setting' may involve an operation for storing information related to the screen in the storage module 210 in order to display the reference screen. The input module 240 may receive, for example, an input for displaying the reference screen. Attributes of the screen may include, for example, at least one of the position of the reference screen, a sound volume for the reference screen, brightness of the screen, and the size of the screen. If the input module 240 is included in a second electronic device, the input module 240 may not be provided in the electronic device according to various embodiments of the present disclosure.

FIG. 4 illustrates an example simplified block diagram of a wireless station 106. According to embodiments, wireless station 106 may be a user equipment (UE) device, a mobile device and/or mobile station. Wireless station 106 may be used in conjunction with the system described above in reference to FIGS. 3A and 3B and the systems described below in reference to FIGS. 5B and 5C. For example, wireless station 106 may be configured as an input device to any of the described systems (e.g., wireless station 106 may be configured as a user input device). As another example, according to some embodiments, wireless station 106 may be configured as a display of any of the described systems. Thus, wireless station 106 may be configured to display a stereoscopic image. In some embodiments, wireless station 106 may be configured to communicate with a 3D system either wirelessly (e.g., via a local area network such as a Wi-Fi, Bluetooth, or Bluetooth low energy connection) or via a wired interface such as a universal serial bus interface, among other wired interfaces. In some embodiments, wireless station 106 may be included in a computer system, such as computer system 100B described above.

As shown, the wireless station 106 may include a system on chip (SOC) 300, which may include portions for various purposes. The SOC 300 may be coupled to various other circuits of the wireless station 106. For example, the wireless station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The wireless station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the wireless station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As described herein, the wireless station 106 may include hardware and software components for implementing the features described herein, e.g., the wireless station 106 may form at least part of a 3D display system such as system 100 described above and/or systems 500A and 5B described below. For example, the processor 302 of the wireless station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Figure 5A:
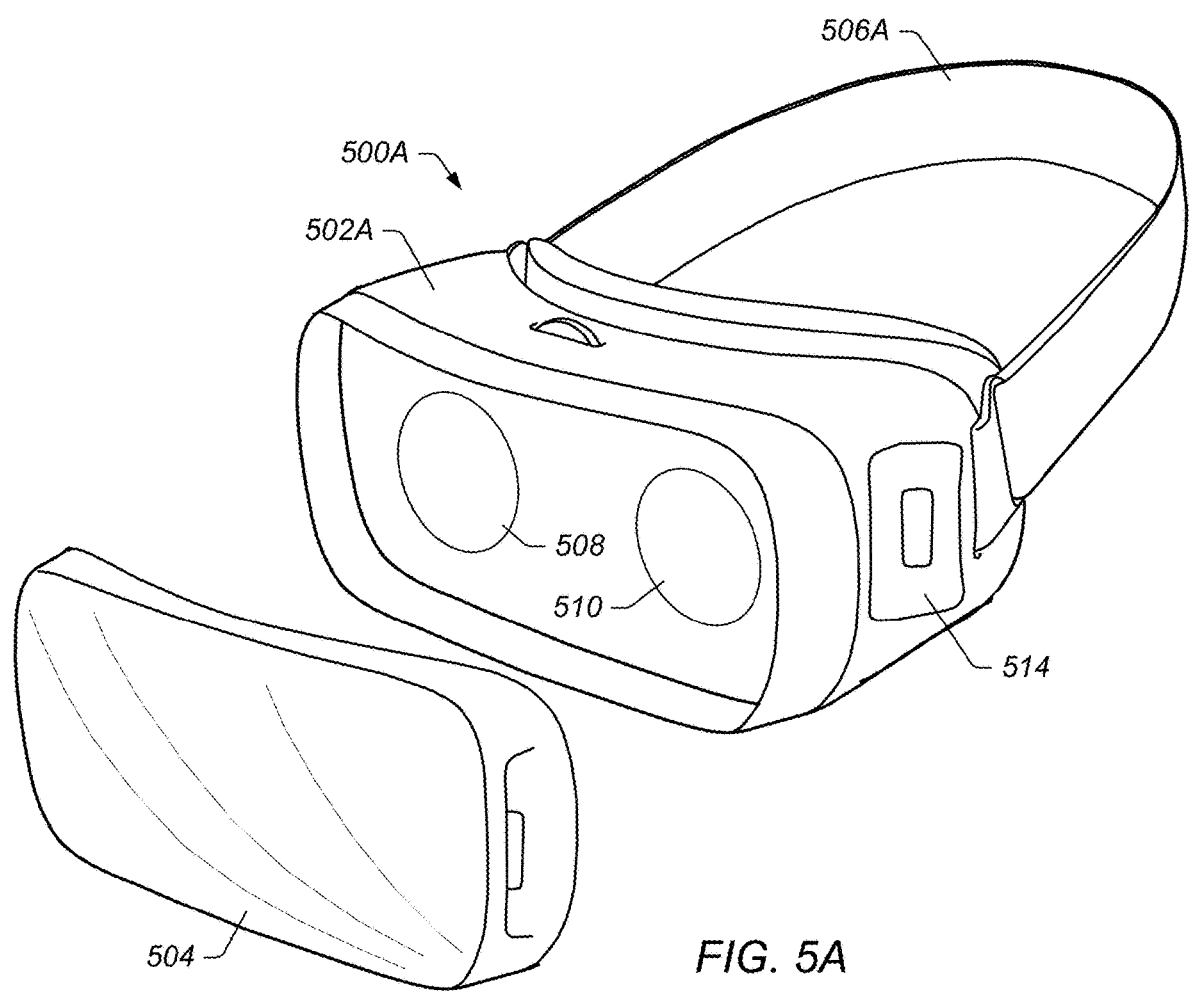
FIGS. 5A and 5B illustrate examples of a 3D head-mounted stereoscopic display system configured according to some embodiments.

Referring to FIG. 5A, a head-mounted electronic device 500A may include a body 502A and a cover 504. The body 502 may include lenses 508 and 510, and a control device 514. In addition, electronic device 500A may include a support 506A which may be configured to support electronic device 500A on a user's head. Lenses 508 and 510 may be positioned to correspond to eyes of a user. The user may view a screen on a display through lenses 508 and 510. The display may be coupled or connected to electronic device 500. In some embodiments, the display may be included on (or in) cover 504 and cover 504 may be configured to couple to body 502A. In some embodiments, electronic device 500B may include a display, such as display 150A or 150B described above in reference to FIG. 4. Thus, cover 504 may be communicatively coupled to body 502A (e.g., to couple a display of cover 504 to a processor of electronic device 500) and mechanically coupled (e.g., attached to) body 502. In some embodiments, the communicative coupling between body 502A and cover 504 may be wired and/or wireless.

In some embodiments, control device 514 may be located on a side surface of body 502A. Control device 514 may be used for the user to enter an input for controlling the head-mounted electronic device 500A. For example, control device 514 may include a touch panel, a button, a wheel key, and/or a touch pad. The touch panel may receive the user's touch input. The touch input may be a direct touch input to the touch panel or a hovering input in the vicinity of the touch panel.

Figure 5B:
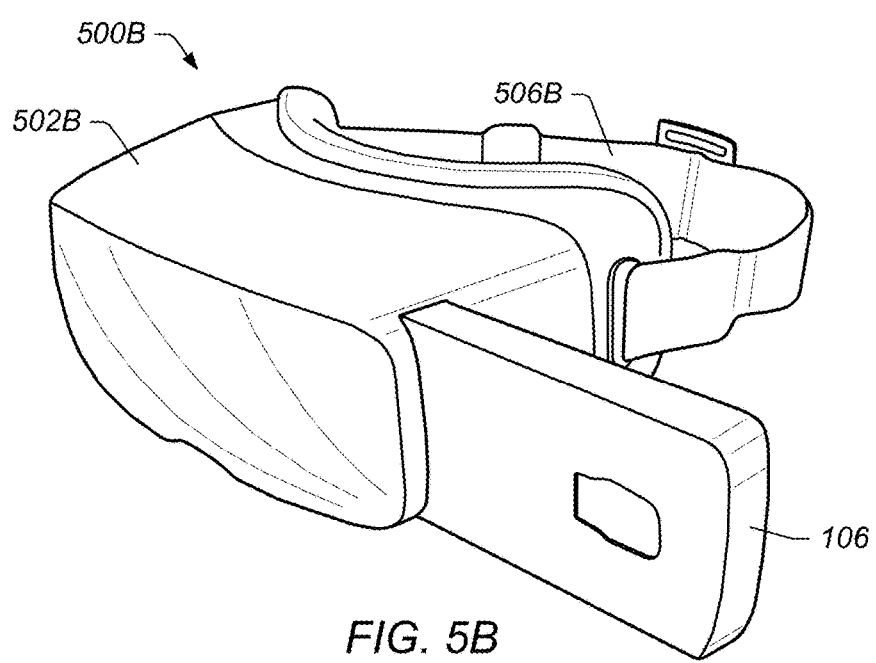

Turning to FIG. 5B, a head-mounted electronic device 500B may include a body 502B and a support 506B. Body 502B may be configured to couple to a wireless station and a display of electronic device 500B may be a display of a wireless station, such as wireless station 106, and the wireless station may be coupled or connected to (e.g., may be detachably mounted to) electronic device 500B. In other words, electronic device 500B may be configured such that a wireless station may be non-permanently coupled to, and removable without destructive measures, to electronic device 500B. Thus, electronic device 500B may be coupled to and decoupled from (e.g., non-destructively decoupled from) a wireless station without a change in functionality of the wireless station or electronic device 500B.

Figure 5C:
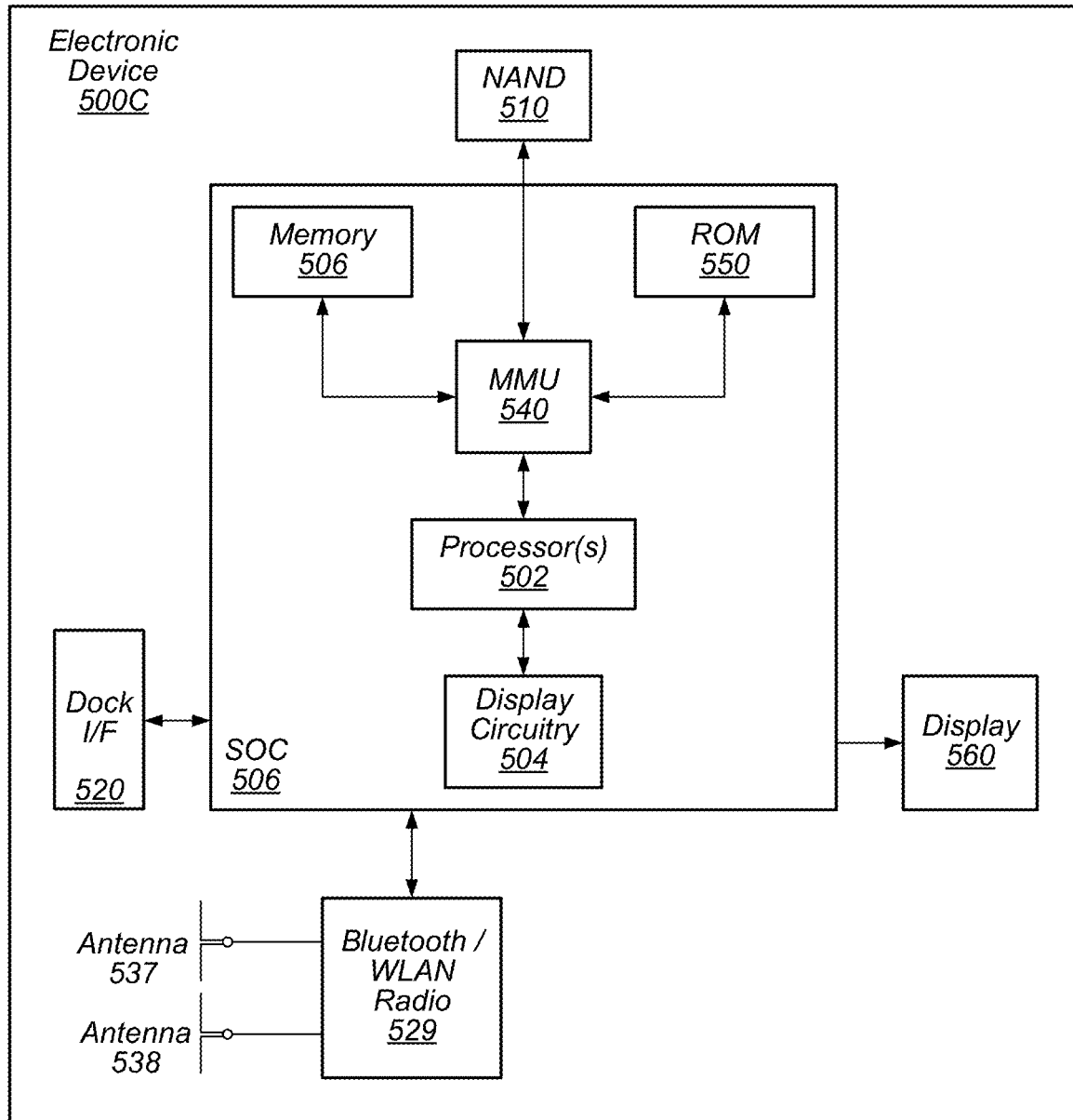
FIG. 5C illustrates an example block diagram of a head-mounted electronic device configured according to some embodiments.

Turning to FIG. 5C, FIG. 5C illustrates an example simplified block diagram of a head-mounted electronic device 500C. According to embodiments, electronic device 500C may be include a display (e.g., such as electronic device 500A) or may be configured to couple to wireless station (e.g., such as electronic device 500B). Note that electronic devices 500A and 500B described above may include at least portions of the features described in reference to electronic device 500C.

As shown, the electronic device 500C may include a system on chip (SOC) 506, which may include portions for various purposes. The SOC 506 may be coupled to various other circuits of the electronic device 500C. For example, the electronic device 500C may include various types of memory (e.g., including NAND flash 510), a connector interface (I/F) (or dock) 520 (e.g., for coupling to a computer system, dock, charging station, external display, etc.), the display 560 (note that is some embodiments, electronic device 500C may not include display 560), and short to medium range wireless communication circuitry 529 (e.g., Bluetooth™ and WLAN circuitry). The short to medium range wireless communication circuitry 529 may also couple to one or more antennas, such as antennas 537 and 538 as shown. The short to medium range wireless communication circuitry 529 may include multiple receive chains and/or multiple transmit chains for receiving and/or transmitting multiple spatial streams, such as in a multiple-input multiple output (MIMO) configuration.

As shown, the SOC 506 may include processor(s) 502, which may execute program instructions for the electronic device 500C and display circuitry 504, which may perform graphics processing and provide display signals to the display 560 (and/or to dock 520). The processor(s) 502 may also be coupled to memory management unit (MMU) 540, which may be configured to receive addresses from the processor(s) 502 and translate those addresses to locations in memory (e.g., memory 506, read only memory (ROM) 550, NAND flash memory 510) and/or to other circuits or devices, such as the display circuitry 504, short range wireless communication circuitry 529, connector interface (I/F) 520, and/or display 560. The MMU 540 may be configured to perform memory protection and page table translation or set up. In some embodiments, the MMU 540 may be included as a portion of the processor(s) 502.

In some embodiments, electronic device 500C (and/or an electronic device such as electronic device 500A or 500B) may be in communication with a user input device, such as user input device 130 described above. In some embodiments, the electronic device may receive user input via user input device 130 as described above.

In addition, in some embodiments, electronic device 500C may include one or more positional sensors such as accelerometers, gyroscopic sensors, geomagnetic sensors, magnetic sensors, proximity sensors, gesture sensors, grip sensors, and/or biometric sensors. In some embodiments, the electronic device may acquire information for determining a motion of a user wearing the electronic device and/or whether a user wears or removes electronic device 500C, using the one or more positional sensors. The at least one processor may control execution of a function(s) or an operation(s) corresponding to an input received through a control device (for example, control device 514 and/or user input device 130) in response to a received input.

As described herein, the electronic device 500C may include hardware and software components for implementing the features described herein, e.g., the electronic device 500C may form at least part of a 3D display system such as system 100 described above and/or systems 500A and 5B described below. For example, the processor 502 of the electronic device 500C may be configured to implement part or all of the features described herein, e.g., by executing program instructions stored on a memory medium (e.g., a non-transitory computer-readable memory medium). Alternatively (or in addition), processor 502 may be configured as a programmable hardware element, such as an FPGA (Field Programmable Gate Array), or as an ASIC (Application Specific Integrated Circuit). Alternatively (or in addition) the processor 502 of the UE 106, in conjunction with one or more of the other components 500, 504, 506, 510, 520, 535, 550, 560 may be configured to implement part or all of the features described herein.

In some embodiments, electronic device 500C may include or be in communication with one or more external cameras. For example, electronic device 500C may include (or be in communication with) one or more cameras (or an array of cameras) that may be configured to capture images of a physical location of a user.

In addition, as described herein, processor 502 may include one or more processing elements. Thus, processor 502 may include one or more integrated circuits (ICs) that are configured to perform the functions of processor 502. In addition, each integrated circuit may include circuitry (e.g., first circuitry, second circuitry, etc.) configured to perform the functions of processor(s) 502.

Figure 6:
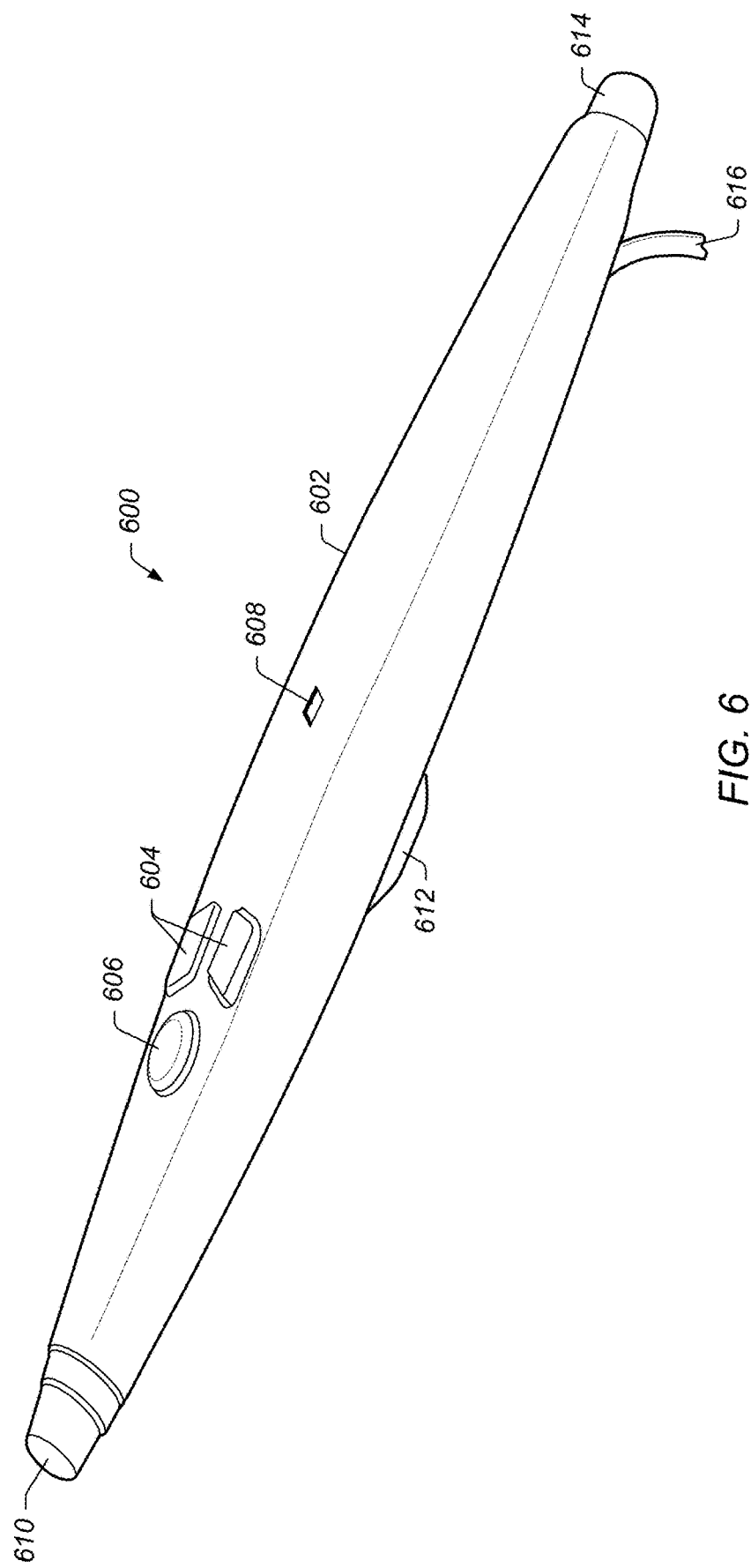
FIG. 6 illustrates an example of a user input device, according to some embodiments.

FIG. 6 illustrates an example of a user input device, according to some embodiments. As shown, a user input device 600 may be configured to perform various embodiments as described herein. User input device 600 may be similar to or the same as user input device 130 as described above in reference to FIGS. 4 and 5B-5C. Thus, user input device 600 may be used in conjunction with, or be included in, system 100 or systems 500 and 550. As described above, systems 100, 500, and 550 may have the capability to determine the six-axis position and orientation of user input device 600. Note that this includes the X, Y, Z location of tip 610 of user input device 600 and the a, (3, y angular orientation of body 602 of user input device 600. However, it should be further noted that user input device 600 is exemplary, and that other user input devices, suitably configured, may be used as desired.

As shown, user input device 600 may include buttons 604, 606, and 612. One of the buttons, such as button 606, may be depressed and held down to trigger the selection of an object within a 3D scene presented by any of systems 100, 500, and 550. Additionally, system 100 may be configured to display a virtual "laser like" projection from tip 610 to the selected object. With the object selected, adjustment of the position and/or orientation of user input device 600 may change the position and/or orientation of the object. Thus, movements of the user input device 600 may result in corresponding translations and/or rotations of the object.

Replacing 2D Images with Substantially Equivalent 3D Images

Existing web pages (e.g., hosted on a website) commonly include (or contain, e.g., with a web page structure) two-dimensional (2D) images. However, as technology evolves and augmented reality (AR) and/or virtual reality (VR) become more prevalent and accessible, there is considerable evidence to suggest that significant advantages can be derived if some or all of the images are presented as three-dimensional (3D) images. For example, 3D images typically attract greater attention as compared to 2D images. Thus, users (or visitors) to web pages may spend additional time on a web page based on 3D images being displayed instead of 2D images. In addition, 3D images often allow for longer retention of content displayed as compared to 2D images. Thus, the replacement of 2D images with substantially equivalent 3D images may allow a web page to attract more visitors that may spend more time on the web page with greater retention of content as compared to not replacing the 2D images.

In order to accomplish the conversion of 2D images to 3D images, the 2D images need to be identified within the 2D web page and a display device needs to be capable of displaying 3D images. Two things are needed to make this happen. In some embodiments, conversion of 2D images to 3D images may include determination of content of the 2D image, sourcing of a 3D image with substantially equivalent content, and replacement of the 2D image with a substantially equivalent 3D image (e.g., based, at least in part, on the determination of content of the 2D image). Disclosed herein are embodiments of systems for implementing methods for replacing 2D images in a web page with substantially equivalent 3D images. The 3D images may be derived from alternative 3D imagery. The alternative 3D imagery (or images) may be available from the web site being visited (e.g., hosting the web page) and/or from elsewhere in the Internet. In addition, embodiments of systems for implementing methods for determining and/or selecting (e.g., based, at least in part, on one or more criterion such as content of the 2D image) an optimum (e.g., substantially equivalent) 3D replacement image are disclosed herein.

Figure 7:
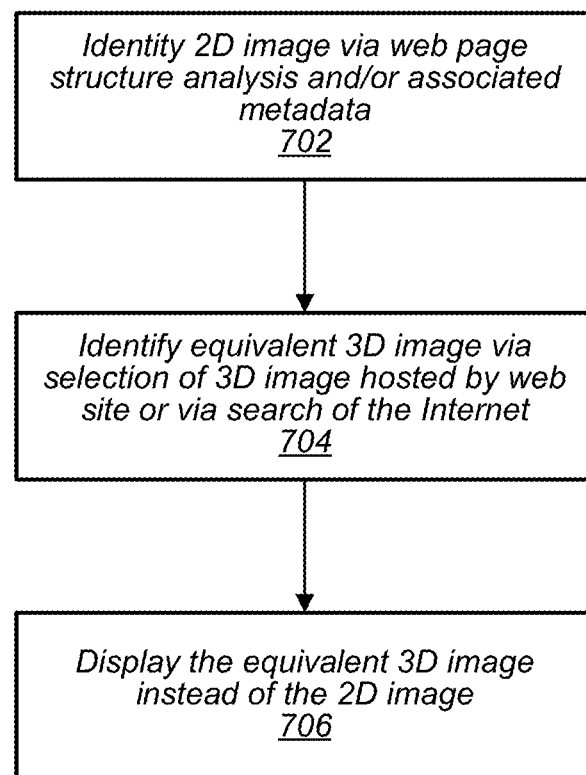
FIG. 7 illustrates a block diagram of an example of a process for identifying and replacing 2D images with equivalent 3D images, according to some embodiments.

FIG. 7 illustrates a block diagram of an example of a process for identifying and replacing 2D images with equivalent 3D images, according to some embodiments. The process shown in FIG. 7 may be used in conjunction with any of the systems or devices shown in the above Figures, among other devices. In various embodiments, some of the process elements shown may be performed concurrently, in a different order than shown, or may be omitted. Additional process elements may also be performed as desired. As shown, this process may operate as follows.

At 702, content of a 2D image within a web page may be identified. For example, identification may include identification of metadata associated with the 2D image. Alternatively, or in addition, if metadata is not (readily) available, a machine learning algorithm may be used to identify the content of the 2D image, e.g., via analysis (or scanning) of a web page structure.

At 704, once the content of the 2D image has been identified, a 3D image with substantially equivalent content may be identified (or located). For example, if the web page being visited has available a suitable, alternative 3D image (e.g., a substantially equivalent 3D image), the process may select the alternative 3D image. Alternatively, if the web page does not offer a 3D image as an alternative, a suitable 3D image (e.g., a substantially equivalent 3D image) may be sourced (e.g., searched for and located/found) from elsewhere in the Internet. For example, in searching the Internet, a suitable 3D image may be identified (e.g., found or located in the Internet) based, at least in part, on metadata associated with the 3D image. Alternatively, if a suitable 3D image with identifying metadata is not found in the Internet, content of 3D images that are found in the Internet may be analyzed using machine learning. As another example, content of 3D images in the Internet may be indexed and suitable 3D image replacements may be identified based, at least in part, on a search of indexed content of 3D images. As a further example, a frame (or frames) of a 2D video or 3D video may include content suitable for sourcing a suitable 3D image. Note that combining several video frames may improve a quality of match of the suitable 3D image to that of the 2D image. Further examples may include applying other and/or additional criteria to a process of selecting the suitable 3D image to replace a 2D image. Such criteria may include details of the shape of the 3D image and/or the lighting of the 3D image.

Further, such criteria may include information from a user of the web page. For example, the user may be interrogated (or surveyed) for information to assist in selection of a suitable 3D image to replace the 2D image. As an example, if a web page has a 2D image of a dog and is seeking to replace the 2D image of the dog with a suitable 3D image of a dog, an application may survey the user's interest related to a specific breed, color, size, and/or age of dog. In addition (or alternatively), the application may derive (or further enhance) such additional information based on a browsing history and/or other online history of the user.

At 706, the 3D image may be integrated into the web page, e.g., the 3D image may be displayed in the web page instead of the 2D image. In addition, a user may interact with the integrated 3D image. For example, the 3D image may be reoriented, translated (e.g., moved in any direction along any combination of an X, Y, Z axis), rotated (e.g., in any direction about any combination of an X, Y, Z axis), and so forth. In other words, the 3D image may be capable of reorientation, translation, and/or other types of manipulation. The manipulation(s) may be responsive to user input via a user input device (e.g., such as the user input devices 130 and 600 described above) and/or from information derived (e.g., in real time) from user head and/or eye tracking as described above. In some embodiments, the information derived from user head and/or eye tracking may include detecting movement (e.g., change) in a view point (or point of view) of a user.

Figure 8A:
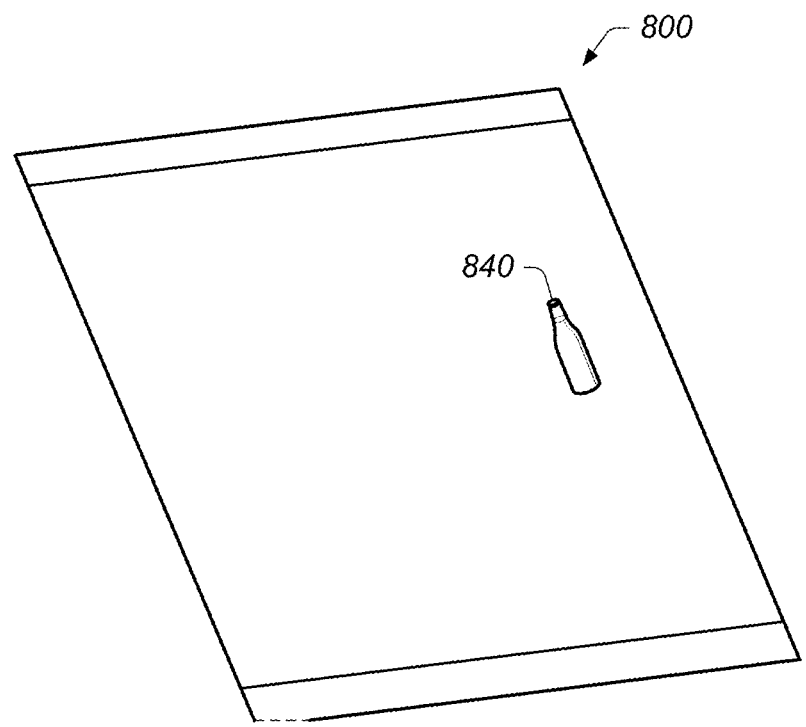
FIGS. 8A-D illustrate an example of one possible manipulation of a 3D image, according to some embodiments.
Figure 8B:
Figure 8C:
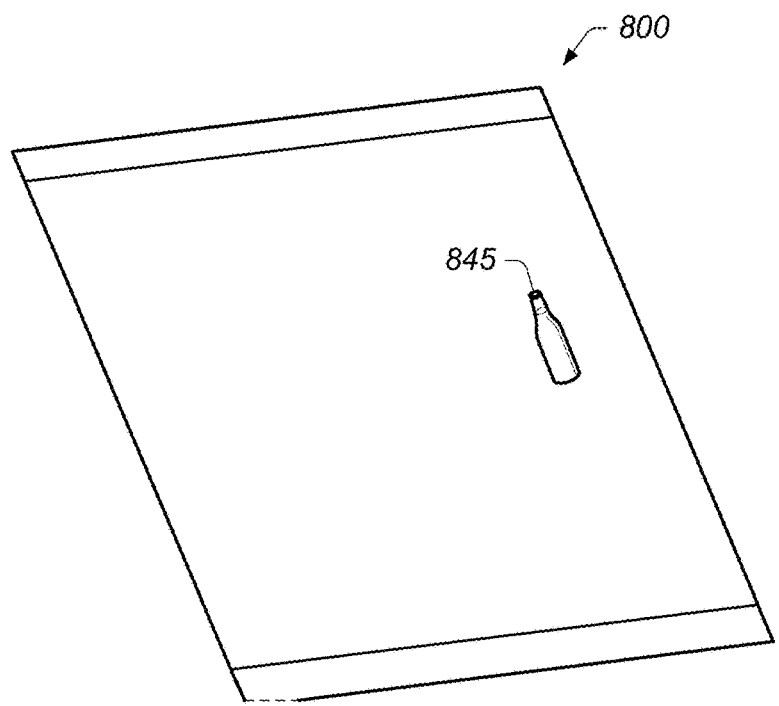
Figure 8D:
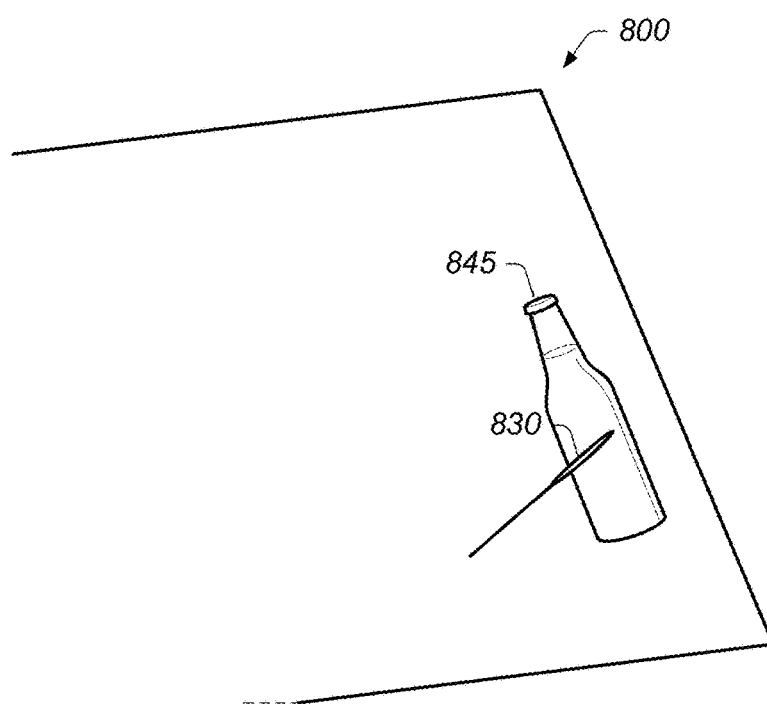

FIGS. 8A-D illustrate an example of one possible manipulation of a 3D image, according to some embodiments. As shown in FIG. 8A, a webpage 800 may include a 2D image 840. The 2D image 840 may be identified by a process, e.g., as described above in reference to FIG. 7, and a suitable or equivalent 3D image 845, as shown if FIG. 8B, may be identified (e.g., via meta data association and/or via the Internet). As shown in FIG. 8C, 3D image 845 may replace 2D image 840, however, 3D image 845 may be manually and/or automatically reoriented so that an aspect ratio of 3D image 845 is equivalent to that of 2D image 840. In some embodiments, 3D image 845 may be flattened when inserted into web page 800. In other words, a value of 3D image 845 z-scale component may be reduced such that 3D image 845 appears as a 2D image. In some embodiments, as illustrated by FIG. 8D, once a user intersects 3D image 845 with a user input device (e.g., stylus 130/600) the z-scale component of 3D image 845 may be animated back to its original value, thus appearing 3D. Note that the z-axis may be an axis associated with a depth of the 3D image (e.g., into or out of a plane defined by a display), whereas an x-axis and y-axis may be associated with in-plane dimensions (e.g., in the plane of the display) and/or movements. Such an animation may create an effect of seamless animation of the object from 2D to 3D on hover (and back to 2D off of hover).

Figure 9:
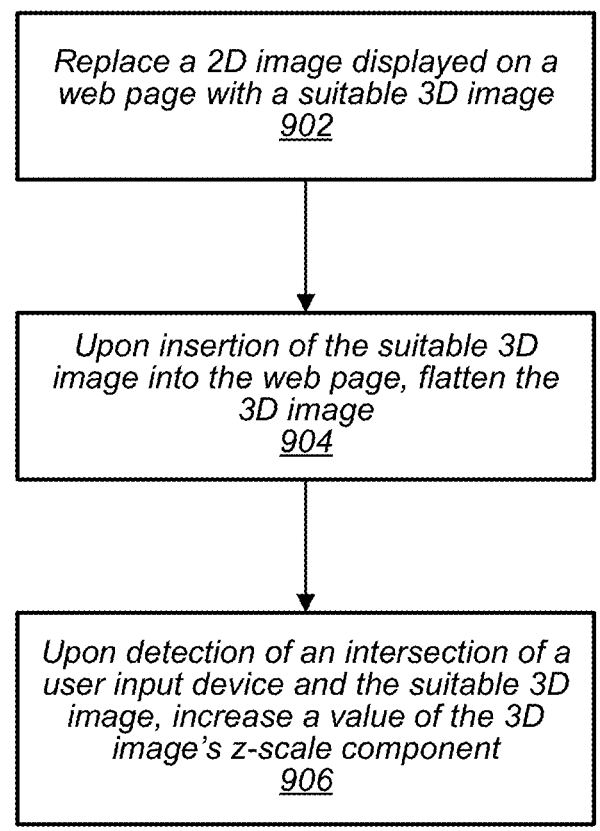
FIG. 9 illustrates a block diagram of an example of a process for flattening a 3D image upon integration into a web page as a replacement of a 2D image, according to some embodiments.

FIG. 9 illustrates a block diagram of an example of a process for flattening a 3D image upon integration into a web page as a replacement of a 2D image, according to some embodiments. The process shown in FIG. 9 may be used in conjunction with any of the systems or devices shown in the above Figures, among other devices. In various embodiments, some of the process elements shown may be performed concurrently, in a different order than shown, or may be omitted. Additional process elements may also be performed as desired. As shown, this process may operate as follows.

At 902, a 2D image displayed on a web page may be replaced by a 3D image. In other words, as described above in reference to FIG. 7, a 2D image may be identified, a suitable 3D image may be located, and the suitable 3D image may be integrated into the web page.

At 904, upon insertion into the web page, the 3D image may be flattened, e.g., by reducing a value of the 3D image's z-scale component. Thus, the 3D image may appear as a 2D image upon insertion into the web page.

At 906, upon detection of an intersection of a user input device (or a projected beam of the user input device) and the 3D image and/or a manipulation of the 3D image, animating the 3D image via increase of the value of the 3D image's z-scale component thereby creating an effect of 3D imagery seamlessly animating from 2D to 3D on hover. In addition, with the user input device (or a projected beam of the user input device) no longer intersects the 3D image, returning the 3D image to a flattened state via reduction of the value of the 3D image's z-scale component. In other words, when the user input device is no longer hovering over the 3D image, the 3D image may return to appearing as a 2D image.

Figure 10A:
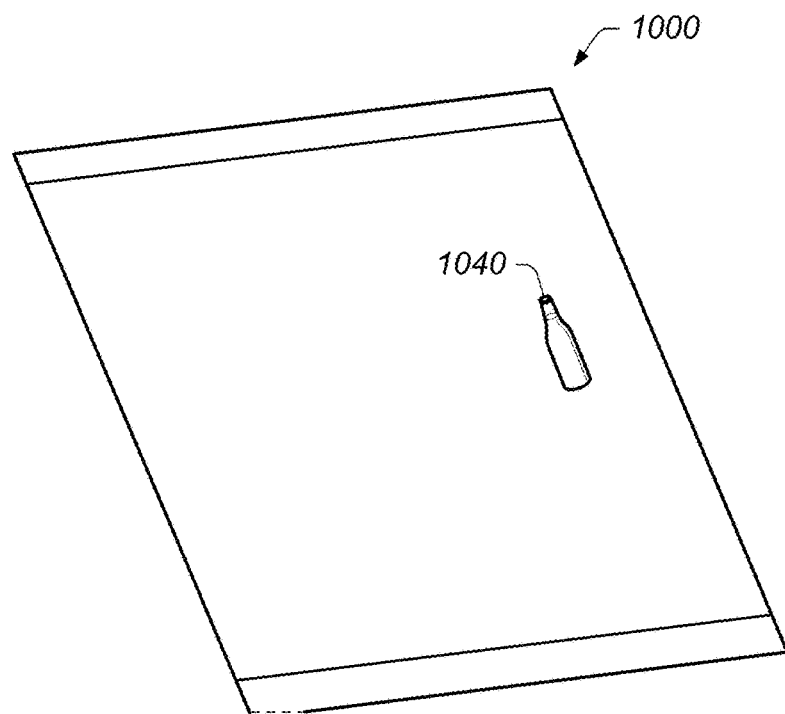
FIGS. 10A-C illustrates an example of another possible manipulation of a 3D image, according to some embodiments.
Figure 10B:
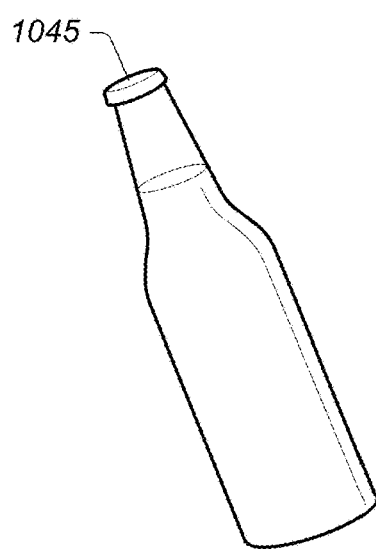
Figure 10C:
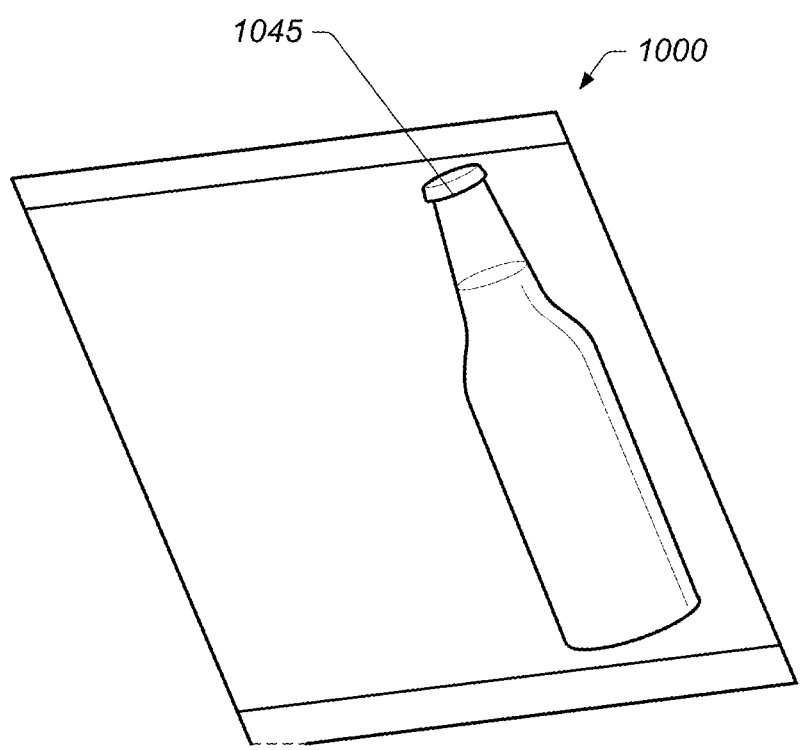

FIGS. 10A-C illustrates an example of another possible manipulation of a 3D image, according to some embodiments. As shown in FIG. 10A, a webpage 1000 may include a 2D image 1040. The 2D image 1040 may be identified by a process, e.g., as described above in reference to FIG. 7, and a suitable or equivalent 3D image 1045, as shown if FIG. 10B, may be identified (e.g., via meta data association and/or via the Internet). As shown in FIG. 10C, the equivalent 3D image may be presented at real world scale/size. In other words, if the actual real-world size of the object represented by the 3D image (e.g., a soda can or soda bottle) fits within the bounds of an application's/browser's viewport, then a user may be provided with a 3D image at real world scale. In some embodiments, the 3D image may first be scaled to the 2D image size and flattened, e.g., as described above in reference to FIGS. 8A-8D and 9 prior to displaying at real world scale, e.g., in response to a user input manipulating the 3D image. In addition, in some embodiments, upon determining that the user is no longer interacting with the 3D image, the 3D image may be re-scaled to the 2D image size. Presentation of real world size objects may be beneficial in applications such as eCommerce. In some embodiments, a customer who is shopping may view a 3D representation (e.g., 3D object) of an item at correct physical scale (an approximate 1:1 correspondence between real world size and virtual world size). For example, a user may be shopping for a ring, thus a 3D virtual representation of the ring may be presented to the user and the user may hold up a finger near the display and/or the 3D representation of the ring to determine whether and how the ring may fit. Similarly, a user may be shopping for a bracelet, thus a 3D representation of the bracelet may be presented to the user and the user may hold up a wrist near the display and/or the 3D representation of the bracelet to determine whether and how the bracelet may fit. As a further example, a user may be shopping for glasses (e.g., eye glass or sun glass frames and/or lenses), thus a 3D representation of the glasses may be presented to the user and the user may be able to visualize how the glasses would look, e.g., via positioning the eyeglasses (e.g., through user input and manipulation of the 3D representation of the glasses) on their face and being presented with a virtual mirror within the virtual 3D scene that provides a reflection of the user wearing the virtual eyeglasses.

As discuss above, selection of a suitable (or equivalent) 3D image may be based on criteria related to the image. For example, in some embodiments the criteria may include a ranking system. Thus, an ordered list of replacement 3D images may be ranked based, at least in part on: (1) a number of times a 3D image was previously selected as a replacement 3D image; (2) a number of votes or endorsements that a 3D image received from users that have previously searched for this type of 3D image; and/or (3) a fee paid by 3D content creators to have 3D imagery ranked higher than non (or lesser) paying 3D content creators. In addition, ranking may also be based, at least in part, on: (1) a level of detail in a 3D image; (2) whether a 3D image contains information relating to an interior of a 3D object being displayed within the 3D image; and/or (3) a size of the 3D image.

Figure 11:
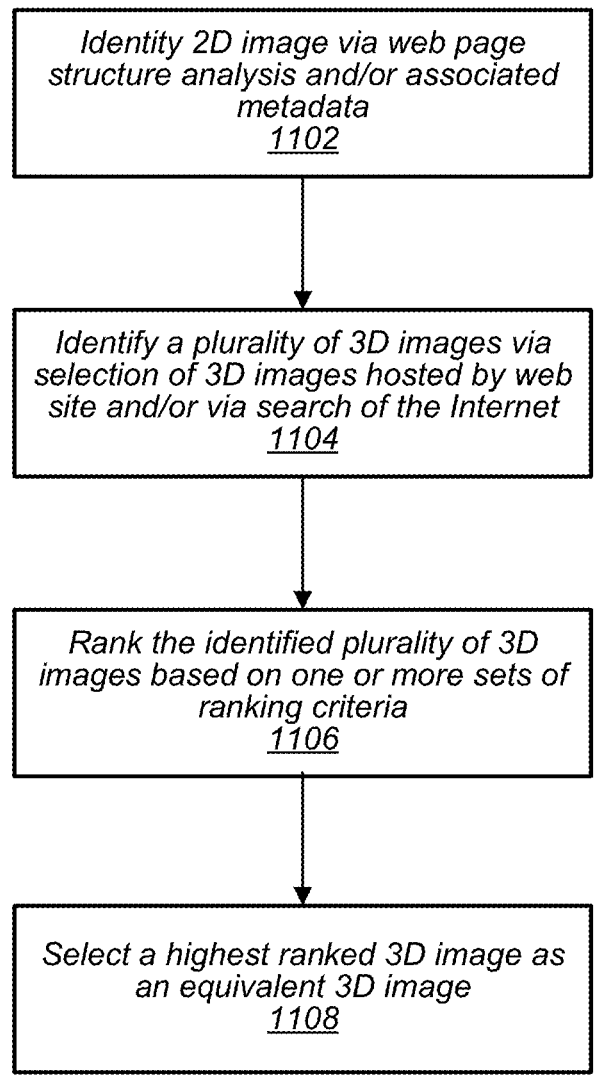
FIG. 11 illustrates a block diagram of an example of a process for selecting a suitable 3D image for replacement of a 2D image displayed on a web page, according to some embodiments.

FIG. 11 illustrates a block diagram of an example of a process for selecting a suitable 3D image for replacement of a 2D image displayed on a web page, according to some embodiments. The process shown in FIG. 11 may be used in conjunction with any of the systems or devices shown in the above Figures, among other devices. In various embodiments, some of the process elements shown may be performed concurrently, in a different order than shown, or may be omitted. Additional process elements may also be performed as desired. As shown, this process may operate as follows.

At 1102, content of a 2D image within a web page may be identified. For example, identification may include identification of metadata associated with the 2D image. Alternatively, or in addition, if metadata is not (readily) available, a machine learning algorithm may be used to identify the content of the 2D image, e.g., via analysis (or scanning) of a web page structure.

At 1104, once the content of the 2D image has been identified, a plurality of 3D images with content similar to the 2D image may be identified (or located). In other words, each of the plurality of 3D images may have imagery, metadata, image tags, and so forth that relate to, or are also associated with, the 2D image. For example, if the web page being visited has available a suitable, alternative 3D image (e.g., a substantially equivalent 3D image), the process may identify the alternative 3D image. Alternatively, if the web page does not offer a 3D image as an alternative, a 3D images may be sourced (e.g., searched for and located/found) from elsewhere in the Internet. For example, in searching the Internet, a 3D image may be identified (e.g., found or located in the Internet) based, at least in part, on metadata associated with the 3D image. Alternatively, if a 3D image with identifying metadata is not found in the Internet, content of 3D images that are found in the Internet may be analyzed using machine learning. As another example, content of 3D images in the Internet may be indexed and 3D image replacements may be identified based, at least in part, on a search of indexed content of 3D images. As a further example, a frame (or frames) of a 2D video or 3D video may include content suitable for sourcing a 3D image. Note that combining several video frames may improve a quality of match of a 3D image to that of the 2D image. Further examples may include applying other and/or additional criteria to a process of selecting a 3D image as a possible replacement of the 2D image. Such criteria may include details of the shape of the 3D image and/or the lighting of the 3D image. Further, in some embodiments, if no well-matched (e.g., suitable) 3D images are found, a 3D reconstruction algorithm may apply to the 2D image and/or 2D video (footage) to produce a reconstructed 3D model which may then be used as a suitable 3D image for replacement in to the web page.

At 1106, the plurality of 3D images may be ranked, e.g., based on one or more sets of ranking criteria. For example, a first set of ranking criteria may include: (1) a number of times a 3D image was previously selected as a replacement 3D image; (2) a number of votes or endorsements that a 3D image received from users that have previously searched for this type of 3D image; and/or (3) a fee paid by 3D content creators to have 3D imagery ranked higher than non (or lesser) paying 3D content creators. In addition, a second set of ranking criteria may include: (1) a level of detail in a 3D image; (2) whether a 3D image contains information relating to an interior of a 3D object being displayed within the 3D image; and/or (3) a size of the 3D image. Note that the ranking of the plurality of 3D images may combine the sets of criteria and/or may consider the sets of criteria separately. In some embodiments, one set of criteria may be weighted as compared to another set of criteria. Such weighting may function as a tie-breaker if rankings from one set of criteria do not produce the same results as rankings from another set of criteria. In some embodiments, such weighting may be used to combine rankings from various sets of criteria.

At 1108, a highest ranked 3D image may be selected as an equivalent 3D image. Once the equivalent (or suitable) 3D image is selected, the equivalent 3D image may be integrated into the web page, e.g., the equivalent 3D image may be displayed in the web page instead of the 2D image. In addition, a user may interact with the integrated equivalent 3D image. For example, the equivalent 3D image may be reoriented, translated (e.g., moved in any direction along any combination of an X, Y, Z axis), rotated (e.g., in any direction about any combination of an X, Y, Z axis), and so forth. In other words, the equivalent 3D image may be capable of reorientation, translation, and/or other types of manipulation. The manipulation(s) may be responsive to user input via a user input device (e.g., such as the user input devices 130 and 600 described above) and/or from information derived (e.g., in real time) from user head and/or eye tracking as described above.

In addition to selection of a suitable (or equivalent) 3D image, a quality or suitability of a particular 3D image may also be improved. For example, once a highest ranked suitable 3D image is identified or selected, imagery may be added to the highest ranked suitable 3D image. The imagery may be derived (or derivable) from a 2D image being replaced by the highest ranked suitable 3D image. As another example, once a highest ranked suitable 3D image is identified or selected, 3D imagery in the highest ranked suitable 3D image that is incorrect may be replaced with correct 3D imagery derived (or derivable) from the 2D image. In other words, 3D imagery that does not correspond to 2D imagery in the 2D image may be removed and/or modified such that corrected 3D imagery does correspond to the 2D imagery. As yet another example, once a highest ranked suitable 3D image is identified or selected, 2D image content may be mapped onto 3D image content to replace existing imagery in the highest ranked suitable 3D image. In addition, a suitable 3D image may be created (or derived) by combining aspects of two or more less suitable 3D images. In other words, if none of the 3D images are suitable, a suitable 3D image may be constructed (or assembled) based on two or more found 3D images.

Further, in some embodiments, a suitable 3D image's model's initial pose may be rendered such that such that the model's orientation, scale, and positioning positioned (e.g., in in-plane directions "x" and "y") may match an orientation, scale, and position (in "x" and "y") from the 2D image being replaced, thereby, creating a seamless user experience in the replacement process from the 2D image to the suitable 3D image.

Figure 12:
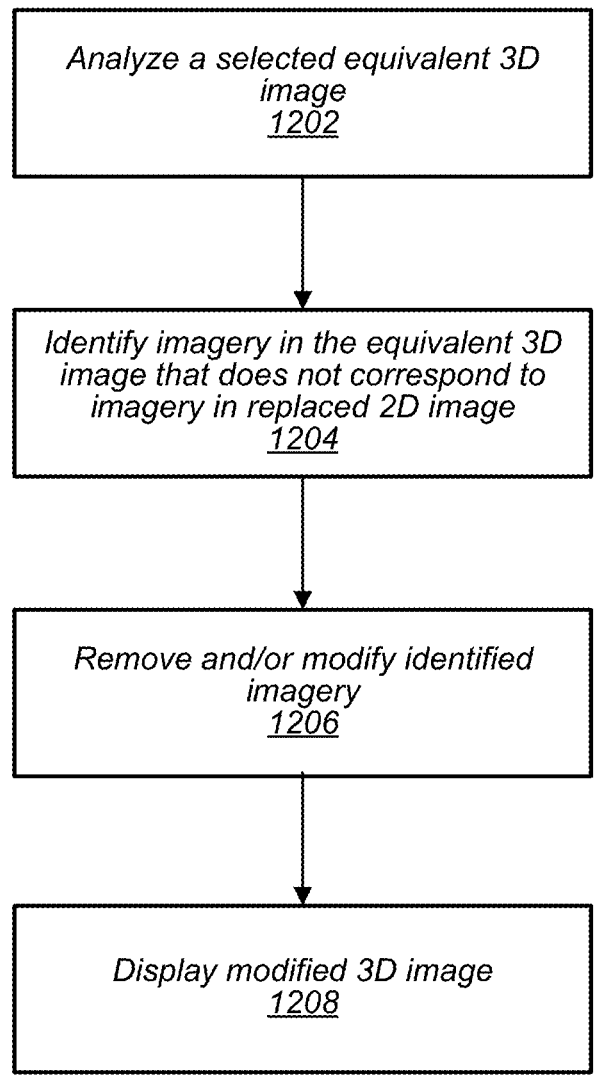
FIG. 12 illustrates a block diagram of an example of a process for improving suitability of a 3D image for replacement of a 2D image displayed on a web page, according to some embodiments.

FIG. 12 illustrates a block diagram of an example of a process for improving suitability of a 3D image for replacement of a 2D image displayed on a web page, according to some embodiments. The process shown in FIG. 12 may be used in conjunction with any of the systems or devices shown in the above Figures, among other devices. In various embodiments, some of the process elements shown may be performed concurrently, in a different order than shown, or may be omitted. Additional process elements may also be performed as desired. As shown, this process may operate as follows.

At 1202, a selected equivalent 3D image (3D image) may be analyzed for accuracy relative to a 2D image the 3D image is replacing. For example, imagery (e.g., background or background objects, foreground or foreground objects, lighting, coloring, shadowing, and so forth) of the 3D image may be compared to imagery of the 2D image.

At 1204, imagery of the 3D image that does not correspond to imagery of the 2D image may be identified and at 1206, the identified imagery may be modified and/or replaced. For example, imagery may be added to 3D image. In some embodiments, the added imagery may be derived (or derivable) from the 2D image. As another example, 2D image content (imagery) may be mapped onto 3D image content to replace existing imagery in 3D image.

At 1208, the modified 3D image may be displayed. In other words, the modified 3D image may be integrated into the web page, e.g., the modified 3D image may be displayed in the web page instead of the 2D image. In addition, a user may interact with the modified 3D image. For example, the modified 3D image may be reoriented, translated (e.g., moved in any direction along any combination of an X, Y, Z axis), rotated (e.g., in any direction about any combination of an X, Y, Z axis), and so forth. In other words, the modified 3D image may be capable of reorientation, translation, and/or other types of manipulation. The manipulation(s) may be responsive to user input via a user input device (e.g., such as the user input devices 130 and 600 described above) and/or from information derived (e.g., in real time) from user head and/or eye tracking as described above.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer readable memory medium storing programming instructions executable by processing circuitry of a wireless device to:
   identify content of a two-dimensional (2D) image displayed within a web page, wherein the web page is displayed to a user;
   identify a plurality of three-dimensional (3D) images with substantially equivalent content as compared to the content of the 2D image, wherein identifying the plurality of 3D images includes
      an interrogation of the user of the web page for information to assist in selection of the 3D image, including questioning the user regarding one or more of a type, color, or size of an object represented by the 2D image; and
      an evaluation of an online history of the user;
   select a 3D image based on the interrogation of the user;
   integrate the 3D image into the web page, thereby replacing the 2D image with the 3D image; and
   receive at least one user input manipulating the 3D image within the web page, wherein the at least one user input comprises movement of a view point of the user, wherein the movement of the view point is determined based, at least in part, on tracking of a head or eyes of the user.

2. The non-transitory computer readable memory medium of claim 1,
   wherein at least a portion of the content of the 3D image corresponds to at least a portion of the content of the 2D image.

3. The non-transitory computer readable memory medium of claim 1,
   wherein, to identify content of the 2D image, the programming instructions are further executable to:
      identify metadata associated with the 2D image; or
      analyze a web page structure of the web page.

4. The non-transitory computer readable memory medium of claim 1,
   wherein, to identify the 3D image, the programming instructions are further executable to:
      determine a location of the 3D image within the web page; or
      source the 3D image via a search of the Internet.

5. The non-transitory computer readable memory medium of claim 4,
   wherein, to source the 3D image, the programming instructions are further executable to:
      search metadata associated with 3D images located on the Internet;
      search an index of content of 3D images located on the Internet.

6. The non-transitory computer readable memory medium of claim 1,
   wherein, to identify the 3D image, the programming instructions are further executable to:
      determine that the content of the 3D image is substantially equivalent to content of the 2D image.

7. The non-transitory computer readable memory medium of claim 1,
   wherein, to integrate the 3D image into the web page, the program instructions are further executable to:
      flatten the 3D image such that the 3D image appears as in two dimensions.

8. The non-transitory computer readable memory medium of claim 7,
   wherein to flatten the 3D image, the program instructions are further executable to decrease a z-scale value associated with a depth of the 3D image.

9. The non-transitory computer readable memory medium of claim 7,
   wherein, upon receiving the at least one user input manipulating the 3D image within the web page, the program instructions are further executable to:
      un-flatten the 3D image such that the 3D image appears in three dimensions.

10. The non-transitory computer readable memory medium of claim 9,
    wherein to un-flatten 3D image, the program instructions are further executable to increase a z-scale value associated with a depth of the 3D image.

11. The non-transitory computer readable memory medium of claim 8,
    wherein, upon flattening the 3D image, scale of the 3D image is adjusted such that a size of the 3D image corresponds to a size of the 2D image.

12. The non-transitory computer readable memory medium of claim 1,
    wherein, to integrate the 3D image into the web page, the program instructions are further executable to:
       replace the 2D image with the 3D image; and
       display the object represented by the 3D image at a real-world size of the object when the real-world size of the object represented by the 3D image fits within the bounds of a web browser displaying the web page.

13. The non-transitory computer readable memory medium of claim 1,
    wherein, to select the 3D image based on the interrogation of the user, the program instructions are further executable to:
    rank the plurality of 3D images based on one or more sets of ranking criteria, wherein a first set of ranking criteria includes a number of times a 3D image was previously selected as a replacement 3D image, a number of endorsements that a 3D image received from users that have previously searched for this type of 3D image, and a fee paid by 3D content creators to have 3D imagery ranked higher than lesser paying or non-paying 3D content creators, and wherein a second set of ranking criteria includes a level of detail in a 3D image and a size of the 3D image; and
    select a 3D image with a highest-ranking value from the plurality of 3D images ranked.

14. A three-dimensional (3D) stereoscopic display system comprising:
    at least one processor;
    one or more displays, coupled to the at least one processor; and a memory coupled to the at least one processor, wherein the at least one processor is configured to:
identify content of a two-dimensional (2D) image displayed within a web page displayed on at least one of the one or more displays, wherein the web page is displayed to a user;
identify, via a search of a web page structure or a search of the Internet and an interrogation of the user of the web page for information to assist in selection of 3D images, including questioning the user regarding one or more of a type, color, or size of an object represented by the 2D image, a 3D image with substantially equivalent content as compared to the content of the 2D image;
replace the 2D image with a flattened 3D image, thereby integrating the 3D image into the web page, wherein a z-scale value associated with a depth of the 3D image is decreased to flatten the 3D image;
receive, from the user, at least one user input manipulating the 3D image within the web page, wherein the at least one user input comprises detection of a beam projected from an end of a user input device intersecting with the 3D image, wherein the detection of the beam intersecting with the 3D image is based, at least in part, on tracking location and orientation of the user input device relative to the at least one display; and
upon receiving, from the user, the at least one user input manipulating the 3D image within the web page, un-flatten the 3D image such that the image appears in three dimensions, wherein the z-scale value associated with the depth of the 3D image is increased to un-flatten the 3D image.

15. The 3D stereoscopic display system of claim 14, wherein at least a portion of the content of the 3D image corresponds to at least a portion of the content of the 2D image.

16. The 3D stereoscopic display system of claim 14, wherein, to identify content of the 2D image, the at least one processor is further configured to:
identify metadata associated with the 2D image; or
analyze a web page structure of the web page.

17. The 3D stereoscopic display system of claim 14, wherein, to identify the 3D image, the at least one processor is further configured to:
determine a location of the 3D image within the web page; or
source the 3D image via a search of the Internet.

18. The 3D stereoscopic display system of claim 17, wherein, to source the 3D image, the at least one processor is further configured to:
search metadata associated with 3D images located on the Internet;
search an index of content of 3D images located on the Internet.

19. The 3D stereoscopic display system of claim 14, wherein, to identify the 3D image, the programming instructions are further executable to:
determine that the content of the 3D image is substantially equivalent to content of the 2D image.

20. The 3D stereoscopic display system of claim 14, wherein the at least one processor is further configured to:
receive at least one additional user input, wherein the at least one additional user input indicates that the user is no longer interacting with the 3D image within the web page; and
upon receiving the at least one additional user input, flatten the 3D image such that the image appears in two dimensions, wherein the z-scale value associated with the depth of the 3D image is decreased to flatten the 3D image.

21. The 3D stereoscopic display system of claim 14, wherein, to replace the 2D image, the at least one processor is further configured to:
display the object represented by the 3D image at a real-world size of the object when the real-world size of the object represented by the 3D image fits within the bounds of a web browser displaying the web page.

22. A wireless device, comprising:
at least one antenna;
at least one radio in communication with the at least one antenna and configured to perform wireless communication using at least one radio access technology (RAT);
one or more processors coupled to the at least one radio; and
at least one display in communication with the one or more processors;
wherein the one or more processors are configured to cause the wireless device to:
identify content of a two-dimensional (2D) image displayed within a web page, wherein the web page is displayed to a user;
identify a three-dimensional (3D) image with substantially equivalent content as compared to the content of the 2D image, wherein identifying the 3D image includes
an interrogation of a user of the web page for information to assist in selection of the 3D image, including questioning the user regarding one or more of a type, color, or size of an object represented by the 2D image;
integrate the 3D image into the web page, thereby replacing the 2D image with the 3D image;
receive, from the user, at least one user input manipulating the 3D image within the web page, wherein the at least one user input comprises at least one of:
movement of a point of view of the user relative to the at least one display, wherein the movement of the point of view point is determined based, at least in part, on tracking information of a head or eyes of the user; or
detection of a beam projected from an end of a user input device intersecting with the 3D image, wherein the detection of the beam intersecting with the 3D image is based, at least in part, on tracking location and orientation of the user input device relative to the at least one display; and
upon receiving the at least one user input manipulating the 3D image within the web page,
display the object represented by the 3D image at a real-world size of the object when the real-world size of the object represented by the 3D image fits within the bounds of a web browser displaying the web page.

23. The wireless device of claim 22, wherein at least a portion of the content of the 3D image corresponds to at least a portion of the content of the 2D image.

24. The wireless device of claim 22,
wherein, to identify content of the 2D image, the one or more processors are further configured to:
identify metadata associated with the 2D image; or
analyze a web page structure of the web page.

25. The wireless device of claim 22,
wherein, to identify the 3D image, the one or more processors are further configured to:
determine a location of the 3D image within the web page; or
source the 3D image via a search of the Internet, wherein, to source the 3D image, the at least one processor is further configured to:
search metadata associated with 3D images located on the Internet; or
search an index of content of 3D images located on the Internet.

26. The wireless device of claim 22,
wherein, to identify the 3D image, the one or more processors are further configured to:
determine that the content of the 3D image is substantially equivalent to content of the 2D image.

27. The wireless device of claim 22,
wherein, to integrate the 3D image into the web page, one or more processors are further configured to:
flatten the 3D image such that the 3D image appears as in two dimensions, wherein to flatten the 3D image a z-scale value associated with a depth of the 3D image is decreased.

28. The wireless device of claim 27,
wherein, upon receiving the at least one user input manipulating the 3D image within the web page, the one or more processors are further configured to:
un-flatten the 3D image such that the 3D image appears in three dimensions, wherein to un-flatten 3D image the z-scale value associated with a depth of the 3D image is increased.

29. The wireless device of claim 22,
wherein the one or more processors are further configured to:
receive at least one additional user input, wherein the at least one additional user input indicates that the user is no longer interacting with the 3D image within the web page; and
upon receiving the at least one additional user input, scale the 3D image such that a size of the 3D image corresponds to a size of the 2D image.

30. The 3D stereoscopic display system of claim 22,
wherein the at least one processor is further configured to:
receive at least one additional user input, wherein the at least one additional user input indicates that the user is no longer interacting with the 3D image within the web page; and
upon receiving the at least one additional user input, scale the 3D image such that a size of the 3D image corresponds to a size of the 2D image.

* * * * *